US011051279B2

(12) United States Patent
Bagheri et al.

(10) Patent No.: US 11,051,279 B2
(45) Date of Patent: Jun. 29, 2021

(54) METHOD OF CONTROL CHANNEL MONITORING FOR REDUCED LATENCY OPERATION

(71) Applicant: MOTOROLA MOBILITY LLC, Chicago, IL (US)

(72) Inventors: Hossein Bagheri, Urbana, IL (US); Vijay Nangia, Woodridge, IL (US); Ravikiran Nory, Buffalo Grove, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 16/571,105

(22) Filed: Sep. 14, 2019

(65) Prior Publication Data

US 2020/0015215 A1 Jan. 9, 2020

Related U.S. Application Data

(63) Continuation of application No. 15/635,598, filed on Jun. 28, 2017, now Pat. No. 10,448,372.

(Continued)

(51) Int. Cl.
*H04W 72/04* (2009.01)
*H04L 5/00* (2006.01)
(Continued)

(52) U.S. Cl.
CPC ....... *H04W 72/0406* (2013.01); *H04L 5/0048* (2013.01); *H04L 5/0053* (2013.01);
(Continued)

(58) Field of Classification Search
CPC .......... H04W 72/0406; H04W 72/0446; H04L 5/0048; H04L 5/0053; H04L 41/08; H04L 43/08
See application file for complete search history.

(56) References Cited

U.S. PATENT DOCUMENTS

2017/0105206 A1 4/2017 Maattanen
2018/0288745 A1* 10/2018 Davydov .............. H04L 5/0048
(Continued)

OTHER PUBLICATIONS

Ericsson, "Design of DL DCI for short TTI", RA-160931, Design for DL DCI for Short TTI, 3rd Generation Partnership Project, Feb. 6, 2016.
(Continued)

*Primary Examiner* — Wei Zhao
(74) *Attorney, Agent, or Firm* — Isidore PLLC

(57) ABSTRACT

A user equipment (UE) includes a signal processing unit coupled to a transceiver. The UE includes a processor in communication with the signal processing unit. The processor: receives, via higher layer signaling, a first indication indicating a physical resource block set for control channel monitoring on a serving cell; receives a second indication comprising a bit-map indicating (i) a first configuration for a first set of shortened transmission time intervals of a subframe and (ii) a second configuration for a second set of shortened transmission time intervals of the subframe; monitors a first set of control channel candidates on the physical resource block set in the first set of shortened transmission time intervals according to the first configuration; and monitors a second set of control channel candidates in the physical resource block set in the second set of shortened transmission time intervals according to the second configuration.

22 Claims, 26 Drawing Sheets

Related U.S. Application Data

(60) Provisional application No. 62/374,744, filed on Aug. 12, 2016.

(51) Int. Cl.
*H04L 12/24* (2006.01)
*H04L 12/26* (2006.01)

(52) U.S. Cl.
CPC ............ *H04L 5/0091* (2013.01); *H04L 41/08* (2013.01); *H04L 43/08* (2013.01); *H04W 72/0446* (2013.01)

(56) References Cited

U.S. PATENT DOCUMENTS

2018/0331871 A1\* 11/2018 Martinez ............. H04W 88/085
2018/0332605 A1\* 11/2018 Pelletier ............ H04W 72/1242

OTHER PUBLICATIONS

Intel Corporation, "Downlink Control Signaling Design for Shorten TTI" 3rd Generation Partnership Project (3GPP) May 14, 2016.
Interdigital, "Consideration on SPDCCH Design", R1-165049, SPDCCH, 3rd Generation Partnership Project (3GPP), May 13, 2016.
Lenovo, Design of DL Channels for Shortened TTI, R1-164649, 3rd Generation Partnership Project (3GPP) May 13, 2016.
Patent Cooperation Treaty (PCT), International Search Report and Written Opinion, International Application No. PCT/US2017/046628, dated Feb. 15, 2018.

\* cited by examiner

METHOD OF CONTROL CHANNEL MONITORING FOR REDUCED LATENCY OPERATION

PRIORITY

The present application is a continuation of U.S. application Ser. No. 15/635,598, filed Jun. 28, 2017, which claims priority from U.S. Provisional Application Ser. No. 62/374,744, filed Aug. 12, 2016. The entire content of both applications is incorporated herein by reference.

BACKGROUND

1. Technical Field

The present disclosure relates generally to wireless communication systems, and more particularly to control channel transmission and reception in an Orthogonal Frequency Division Multiplexing (OFDM) communication system.

2. Description of the Related Art

In current 3GPP LTE (Third Generation Partnership Project Long Term Evolution), time-frequency resources are divided into subframes where each 1ms subframe comprises two 0.5 ms slots and each slot (with normal CP duration) comprises 7 SC-FDMA symbols in time domain in uplink (UL) and 7 OFDM symbols in time domain in downlink (DL). In frequency domain, resources within a slot are divided into physical resource blocks (PRBs), where each resource block spans 12 contiguous subcarriers.

In current LTE systems, resources are typically assigned using a 1ms minimum transmission time interval (TTI) when data is available, in a process referred to as dynamic scheduling. Within each scheduled TTI in UL, the UE transmits data over a physical uplink shared channel (PUSCH) in PRB-pairs indicated by an uplink grant to the UE that schedules the data transmission. In DL, the evolved Node B (eNB) transmits data over a physical downlink shared channel (PDSCH) in PRB-pairs indicated by a DL grant/assignment. The UL grant and/or DL assignment information is provided to the UE in a control channel, referred to as a (enhanced) physical downlink control channel PDCCH or EPDCCH. The PDCCH/EPDCCH channel carries the control information about the data being transmitted on the current subframe and the information about the resources that the UE needs to use for the uplink data.

BRIEF DESCRIPTION OF THE DRAWINGS

The description of the illustrative embodiments is to be read in conjunction with the accompanying drawings, wherein.

DETAILED DESCRIPTION

Figure 1:
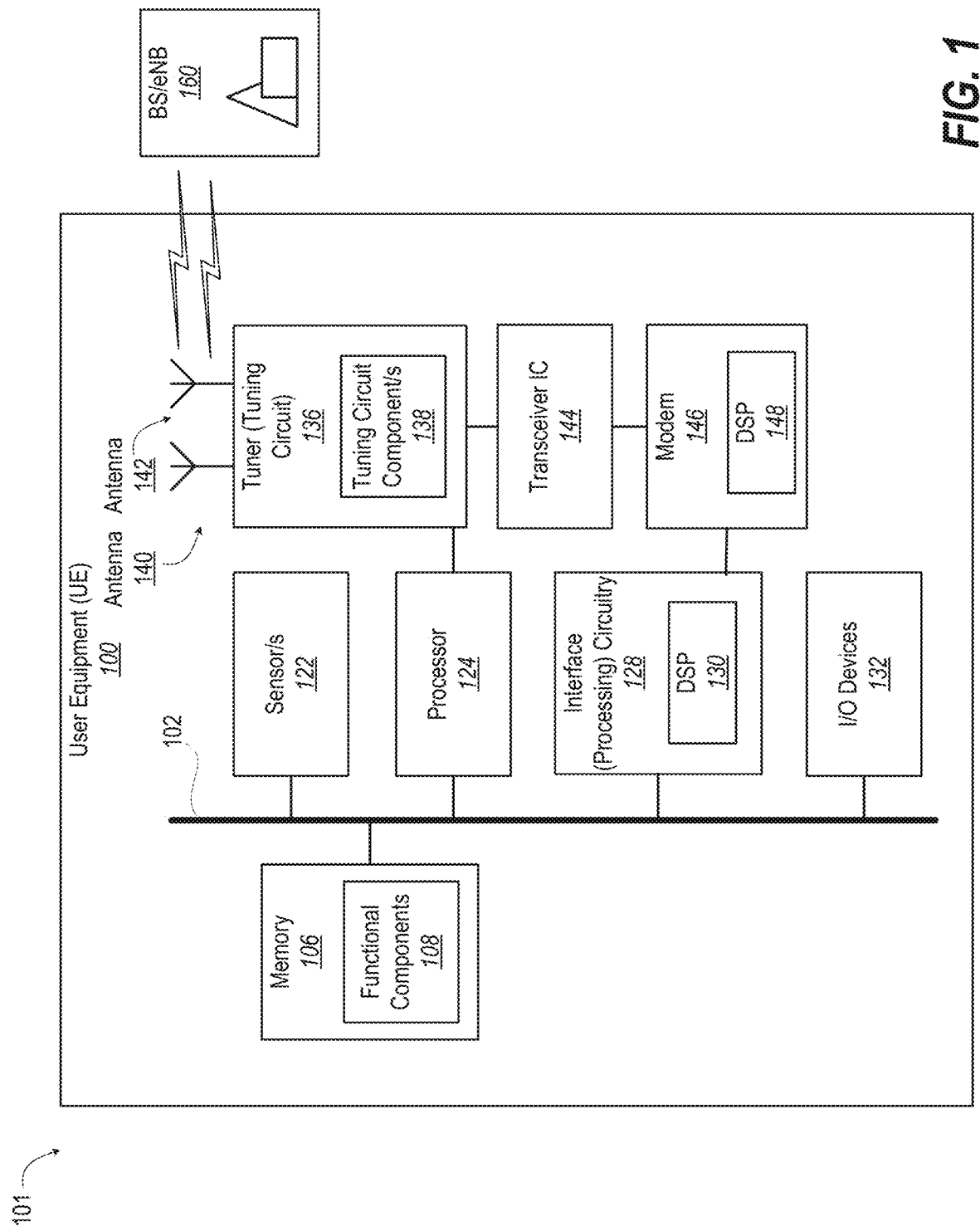
FIG. 1 illustrates a block diagram of an example user equipment (UE), communicating with a wireless network, within which certain of the functional aspects of the described embodiments may be implemented.

The illustrative embodiments of the present disclosure provide a method and user equipment (UE) that implements control channel monitoring to enable reduced latency operation. In one or more embodiments, the method includes receiving, by a user equipment, a first indication indicating a plurality of physical resource block sets. The method includes receiving a first control message in a beginning portion of a subframe. The method includes determining, from the first control message at least one selected physical resource block set from the plurality of physical resource block sets. The method includes monitoring a second control message in the at least one selected physical resource block set of a shortened transmission time interval, wherein the duration of the shortened transmission time interval is smaller than the duration of the subframe.

In one or more embodiments, the method includes receiving, by a user equipment, a first indication from a node in a network indicating a plurality of physical resource block sets. The method includes receiving control signals from a node in a network. The method includes determining, from the control signals, a first control information that indicates at least one selected physical resource block set from a plurality of physical resource block sets containing a second control information that is associated with a shortened transmission time interval. The method includes monitoring the at least one selected physical resource block set to identify the second control information.

In one or more embodiments, the method includes decoding a downlink data channel in the shortened transmission time interval based on the first and second control information. In one or more embodiments, the first control information is received in a first portion of a subframe comprising a downlink control channel. In a particular embodiment, the shortened transmission time interval belongs to the subframe.

In one or more embodiments, the method includes monitoring a default physical resource block set comprising one or more of physical resource block sets from the plurality of the physical resource block sets. The monitoring occurs in response to the user equipment failing to receive the first control information. In one or more embodiments, the method includes monitoring the at least one selected physical resource block set comprising a first physical resource block set and a second physical resource block set, the first physical resource block set having at least one different characteristic than the second physical resource block set from among: (i) spanning a different number of resource blocks than the second physical resource block set; (ii) utilizing a different number of decoding candidates than the second physical resource block set; and (iii) utilizing a different number and value of aggregation levels than the second physical resource block set.

In one or more embodiments, the method includes determining from the first control information at least one of: (i) a number of decoding candidates to be used to monitor for the second control information; and (ii) a subset of the plurality of physical resource block sets. In a particular embodiment, the method further includes determining, based on the first control information, the decoding candidates to be monitored to identify the second control information. The method can further include determining, based on the first control information, decoding candidates to be monitored to identify a third control information. The third control information may contain the scheduling assignment information related to the data transmissions in one or more of the current subframe and a subframe other than the current subframe.

In one or more embodiments, the method includes monitoring the at least one selected physical resource block set to identify the second control information and further includes monitoring a number of decoding candidates determined from the first control information. In one or more embodiments, the method includes determining corresponding decoding candidates for the subset of the plurality of physical resource block sets having respective aggregation levels known by the user equipment. In one or more embodiments, the method includes determining corresponding decoding candidates for receiving the first control signals having respective aggregation levels known by the user equipment. In a particular embodiment, the corresponding decoding candidates include: (i) one physical downlink control channel (PDCCH) decoding candidate at aggregation level 4 with control channel elements (CCEs) corresponding to the PDCCH decoding candidate given by CCEs numbered 0, 1, 2, 3, 4; and (ii) one PDCCH decoding candidate at aggregation level 8 with the CCEs corresponding to the PDCCH decoding candidate given by CCEs numbered, 0, 1, 2, 3, 4, 5, 6, 7. The method further includes decoding a control message with cyclic redundancy check using a common control radio network temporary identifier (CC-RNTI) to determine the corresponding decoding candidates.

In one or more embodiments, the method includes determining, based on the first control information, a first subset of decoding candidates used in a first transmit time interval of a subframe and a second subset of decoding candidates used in a second transmission time interval of the subframe, where the first subset is exclusive of the second subset. In a particular embodiment, the second subset of decoding candidates are monitored to identify the second control information. In one or more embodiments, the first subset of decoding candidates are monitored to identify third control information. The third control information contains the scheduling assignment information related to the data transmissions in one or more of the current subframe or a future subframe.

In one or more embodiments, the second transmission time interval includes a shortened transmission time interval and the first transmission time interval includes two or more shortened transmission time intervals. In a particular embodiment, the method includes receiving, over a higher layer of the network, one of the first and second subsets as a default subset of decoding candidates. In another particular embodiment, the method includes receiving one of the first and second subsets in the first control information. In an additional particular embodiment, the method includes: receiving an indication of one of the first and second subsets; and determining a respective first and second configuration of each transmission time interval of the two or more shortened transmission time intervals of the first transmission time interval. The first and second configurations each include at least one of: (i) a number of decoding candidates; and (ii) an aggregation level of the decoding candidates.

In one embodiment, a first subset of the two or more shortened transmission time intervals of the first transmission time interval is of the first configuration. A second subset of the two or more shortened transmission time intervals of the first transmission time interval is of the second configuration. The first subset is exclusive of the second subset, and the first configuration is different from the second configuration. The method includes: (i) identifying any common reference signals that are transmitted in a selected shortened transmission time interval of the two or more shortened transmission time intervals of the first transmission time interval; and (ii) associating the corresponding one of the first and second configurations based on a presence or absence of common reference signals in the selected shortened transmission time interval.

In one or more embodiments, the method includes receiving an indication in the first control information of a time division duplex configuration that includes more than one uplink/downlink switching point in a subframe. In one or more embodiments, the method includes receiving control signaling via a higher layer of the network of an indication of at least one of: (i) a first user equipment-specific search space corresponding to a first transmission time interval length and which is at a first aggregation level for a serving cell; and (ii) a second user equipment-specific search space corresponding to a second transmission time interval length and which is at a second aggregation level for the serving cell. The method includes determining (a) a first number of control decoding candidates for the first user equipment-specific search space and (b) a second number of control decoding candidates for the second user equipment-specific search space based upon the received control signaling. The length of the first transmission time interval differs from a length of the second transmission time interval. In a particular embodiment, the method includes receiving, in the control signaling via the higher layer of the network, an indication of one of the first and second user-specific search space; and determining another one of the first and second-specific search spaces based on at least one of: (i) the indication of the one of the first and second user-specific search space; (ii) a number of carriers configured for operation with a length of the first transmission time interval; and a (iii) a number of carriers configured for operation with a length of the second transmission time interval.

In accordance with aspects of the present innovation, a user equipment includes a signal processing unit coupled to a transceiver and that is configured to receive a subframe having a plurality of time-frequency resources. A processor is in communication with the signal processing unit. The processor: (i) receives a first indication from a node in a network indicating the presence of a plurality of physical resource block sets; (ii) receives control signaling from the node in a network; (iii) determines, from the control signaling, first control information that indicates at least one selected physical resource block set from the plurality of physical resource block sets that may contain a second control information associated with a shortened transmission time interval; and (iv) monitors the at least one selected physical resource block set to identify the second control information.

In one or more embodiments, the processor of the user equipment determines a first subset of decoding candidates used in a first transmit time interval of the subframe and a second subset of decoding candidates used in a second transmission time interval of the subframe. The first subset is exclusive of the second subset, and the second transmission time interval is a shortened transmission time interval and the first transmission time interval includes two or more shortened transmission time intervals. In a particular embodiment, the processor determines a respective first and second configuration of each transmission time interval of the two or more shortened transmission time intervals of the first transmission time interval. The first and second configurations each includes at least one of: (i) a number of decoding candidates; and (ii) an aggregation level of the decoding candidates. According to one aspect, the first subset of the two or more shortened transmission time intervals of the first transmission time interval are of the first configuration. The second subset of the two or more shortened transmission time intervals of the first transmission time interval are of the second configuration. The first subset is exclusive of the second subset. The first configuration is different from the second configuration.

In one or more embodiments, the processor of the user equipment: (i) determines whether common reference signals are transmitted in each one of the two or more shortened transmission time intervals of the first transmission time interval; (ii) in response to determining that common reference signals are transmitted in a particular shortened transmission time interval, determines that the first configuration applies to the particular shortened transmission time interval; and (iii) in response to determining that common reference signals are not transmitted in the particular shortened transmission time interval, determines that second configuration applies to the particular shortened transmission time interval.

In one or more embodiments, the processor of the user equipment determines that the first control information indicates a time division duplex configuration that includes more than one uplink/downlink switching points. In one or more embodiments, the processor of the user equipment receives, via a higher layer of the network, control signaling of an indication of at least one of: (i) a first user equipment-specific search space corresponding to a first transmission time interval length and which is at a first aggregation level for a serving cell; and (ii) a second user equipment-specific search space corresponding to a second transmission time interval length and which is at a second aggregation level for the serving cell. The processor then determines (a) a first number of control decoding candidates for the first user equipment-specific search space and (b) a second number of control decoding candidates for the second user equipment-specific search space, based on the received control signaling. The first transmission time interval length differs from the second transmission time interval length.

In one or more embodiments, the processor of the user equipment: (a) receives, in the control signaling, an indication of one of the first and second user-specific search space; and (b) determines another one of the first and second-specific search spaces based on at least one of: (i) the indication of the one of the first and second user-specific search space; (ii) a number of carriers configured for operation with a length of the first transmission time interval; and (iii) a number of carriers configured for operation with a length of the second transmission time interval.

In accordance with other aspects of the present innovation, a method is provided for reducing latency of signal decoding operation by optimizing a control channel transmission. The method includes: (i) transmitting, by a node, a first indication to a user equipment in a network, the first indication indicating a plurality of physical resource block sets; (ii) transmitting control signals to the user equipment, where the control signals contain a first control information that indicates at least one selected physical resource block set from the plurality of physical resource block sets that may contain a second control information associated with a shortened transmission time interval; and (iii) transmitting the at least one selected physical resource block set to identify the second control information.

In one or more embodiments, the method includes assigning a first subset of decoding candidates used in a first transmit time interval of the subframe and a second subset of decoding candidates used in a second transmission time interval of the subframe. The first subset is exclusive of the second subset, the second transmission time interval includes a shortened transmission time interval, and the first transmission time interval includes two or more shortened transmission time intervals.

In one or more embodiments, the method includes assigning a respective first and second configuration of each transmission time interval of the two or more shortened transmission time intervals of the first transmission time interval. The first and second configurations each comprise at least one of: (i) a number of decoding candidates; and (ii) an aggregation level of the decoding candidates. In one or more embodiments, a first subset of the two or more shortened transmission time intervals of the first transmission time interval are of the first configuration. A second subset of the two or more shortened transmission time intervals of the first transmission time interval are of the second configuration. The first subset is exclusive of the second subset, and the first configuration is different from the second configuration.

In one or more embodiments, the method includes: (i) determining whether to transmit common reference signals in each one of the two or more shortened transmission time intervals of the first transmission time interval; (ii) in response to determining that common reference signals are to be transmitted in a particular shortened transmission time interval, assigning the first configuration to the particular shortened transmission time interval; and (iii) in response to determining that common reference signals are not to be transmitted in the particular shortened transmission time interval, assigning the second configuration to the particular shortened transmission time interval.

In one or more embodiments, the method includes indicating a time division duplex configuration that comprises more than one uplink/downlink switching points in the first control information. In one or more embodiments, the method includes receiving, via a higher layer of the network, control signaling that provides an indication of at least one of: (i) a first user equipment-specific search space corresponding to a first transmission time interval length and at a first aggregation level for a serving cell; and (ii) a second user equipment-specific search space corresponding to a second transmission time interval length and at a second aggregation level for the serving cell. The method then includes determining (a) a first number of control decoding candidates for the first user equipment-specific search space and (b) a second number of control decoding candidates for the second user equipment-specific search space, based on the received control signaling, where the first transmission time interval length differs from the second transmission time interval length.

In one or more embodiments, the method includes: transmitting, in the control signaling, an indication of one of the first and second user-specific search space, which indication enables the user equipment to determine another one of the first and second-specific search spaces, based on at least one of: (i) the indication of the one of the first and second user-specific search space; (ii) a number of carriers configured for operation with a length of the first transmission time interval; and (iii) a number of carriers configured for operation with a length of the second transmission time interval.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. Embodiments incorporating teachings of the present disclosure are shown and described with respect to the figures presented herein.

FIG. 1 illustrates an example user equipment (UE) 100 such as a wireless communication device (WCD), operating in a communication system 101 such as a Wireless Wide Area Network (WWAN), within which the functional aspects of the described embodiments may be implemented. UE 100 represents a device that is adapted to transmit and receive electromagnetic signals over an air interface via uplink and/or downlink channels between the UE 100 and communication network equipment (e.g., base-station 160) utilizing at least one communication standard, such as Global System for Mobile Communications (GSM), Code Division Multiple Access (CDMA), Orthogonal Frequency Division Multiple Access (OFDMA), Universal Mobile Telecommunications Service (UMTS), Long Term Evolution (LTE), Wireless Local Area Networks (WLAN) (e.g. Wi-Fi) and other wireless communication systems. In one or more embodiments, the UE can be a mobile cellular device/phone or smartphone, or laptop, netbook or tablet computing device, or other types of communications devices.

UE 100 comprises processor 124 and interface circuitry 128, which are connected to memory component 106 via signal bus 102. UE 100 also comprises sensor(s) 122. In one embodiment, sensor(s) 122 is used to measure temperature(s) of RF circuit components, including tuning circuit components. In addition, UE 100 comprises input/output (I/O) devices 132. Also included within UE 100 are radio frequency (RF) tuner (tuning circuit) 136, transceiver integrated circuit (IC) 144 which is communicatively coupled to tuning circuit 136, and modem 146 which is communicatively coupled to transceiver IC 144. In one embodiment, modem 146 includes digital signal processor (DSP) 148. As illustrated within WCD 100, tuning circuit 136 comprises tuning circuit components 138.

In at least some embodiments, the sending and receiving of RF communication signals occur wirelessly and are facilitated by one or more antennas/antenna elements 140 and 142 communicatively coupled to tuning circuit 136. The number of antenna elements can vary from device to device, ranging from one or more antenna elements and the presentation within UE 100 of a particular number (e.g., N) of antenna elements is merely for illustration.

UE 100 is able to wirelessly communicate with one or more base-stations, including eNB 160, via one or more antennas (e.g., antennas 140, 142). Each of the one or more base-stations (e.g., base station 160) can be any one of a number of different types of network stations and/or antennas associated with the infrastructure of the wireless network and configured to support uplink and downlink communication via one or more of the wireless communication protocols supported by a respective wireless network core, as known by those skilled in the art.

In addition to the above described hardware components of UE 100, various features of the invention may be completed or supported via software or firmware code and/or logic stored within at least one of memory 106 and respectively executed by DSP 148 or processor 124. Thus, for example, included within system memory 106 is a number of software, firmware, logic components, modules, or data, generally referenced as functional modules 108, which collectively can perform or configure the UE to perform the functions described in the various UE-implemented methods presented herein.

The various components within UE 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media which can include optical interconnects, or may be indirect interconnections that include one or more intermediate electrical components. Although certain direct interconnections are illustrated in FIG. 1, it is to be understood that more, fewer or different interconnections may be present in other embodiments.

Figure 2:
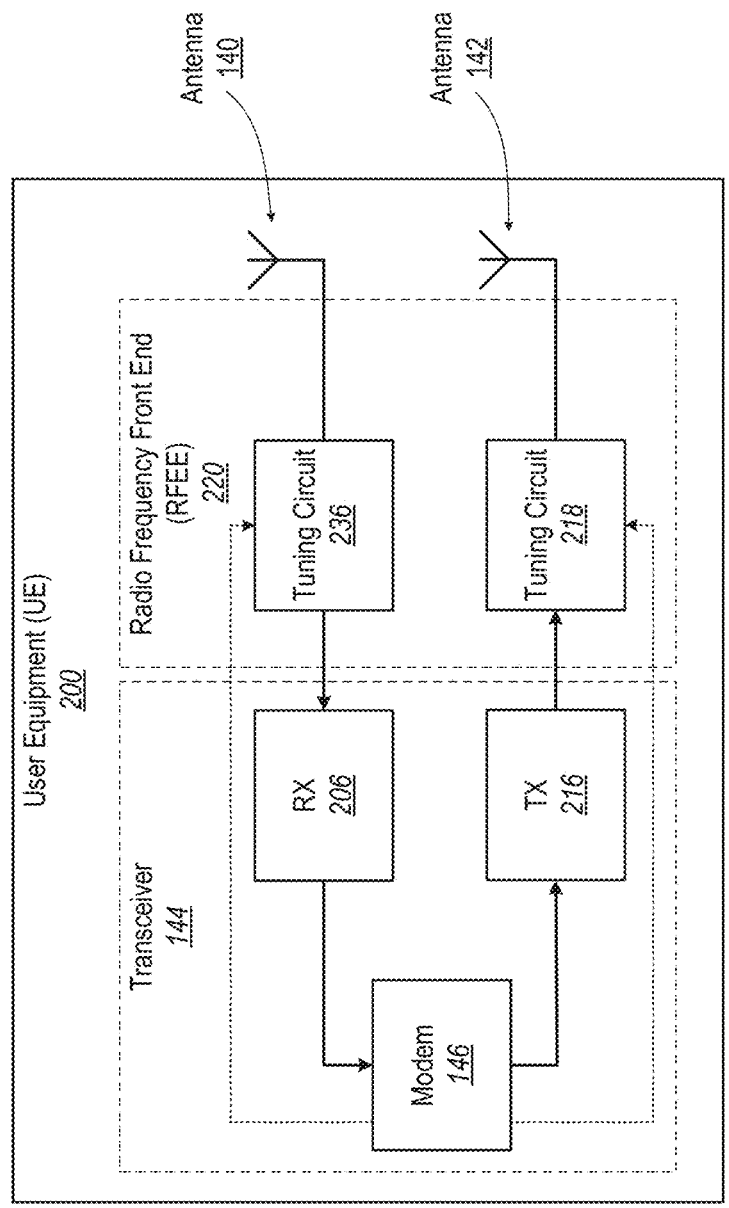
FIG. 2 illustrates a block diagram of an example UE having a modem and radio frequency components, according to one or more embodiments.

FIG. 2 is block diagram of an example UE 200 having a modem and radio frequency components including at least one tuning circuit, according to one embodiment. UE 200 comprises transceiver 144 and radio frequency front end (RFFE) module 220, which is communicatively coupled to transceiver 144. In addition, UE 200 comprises first antenna 140 and second antenna 142 which are both coupled to RFFE module 220. Transceiver 144 comprises modem 146 that is in communication with a number of components within an RF receive signal path and RF transmit signal path, which components include receiver (RX) 206 and transmitter (TX) 216. RFFE module 220 also includes first tuning circuit 236 which is communicatively coupled to an input port of RX 206 within the RF receive signal path. Additionally, RFFE module 220 includes second tuning circuit 218 which is communicatively coupled to an output port of TX 216 within the RF transmit signal path.

Figure 3:
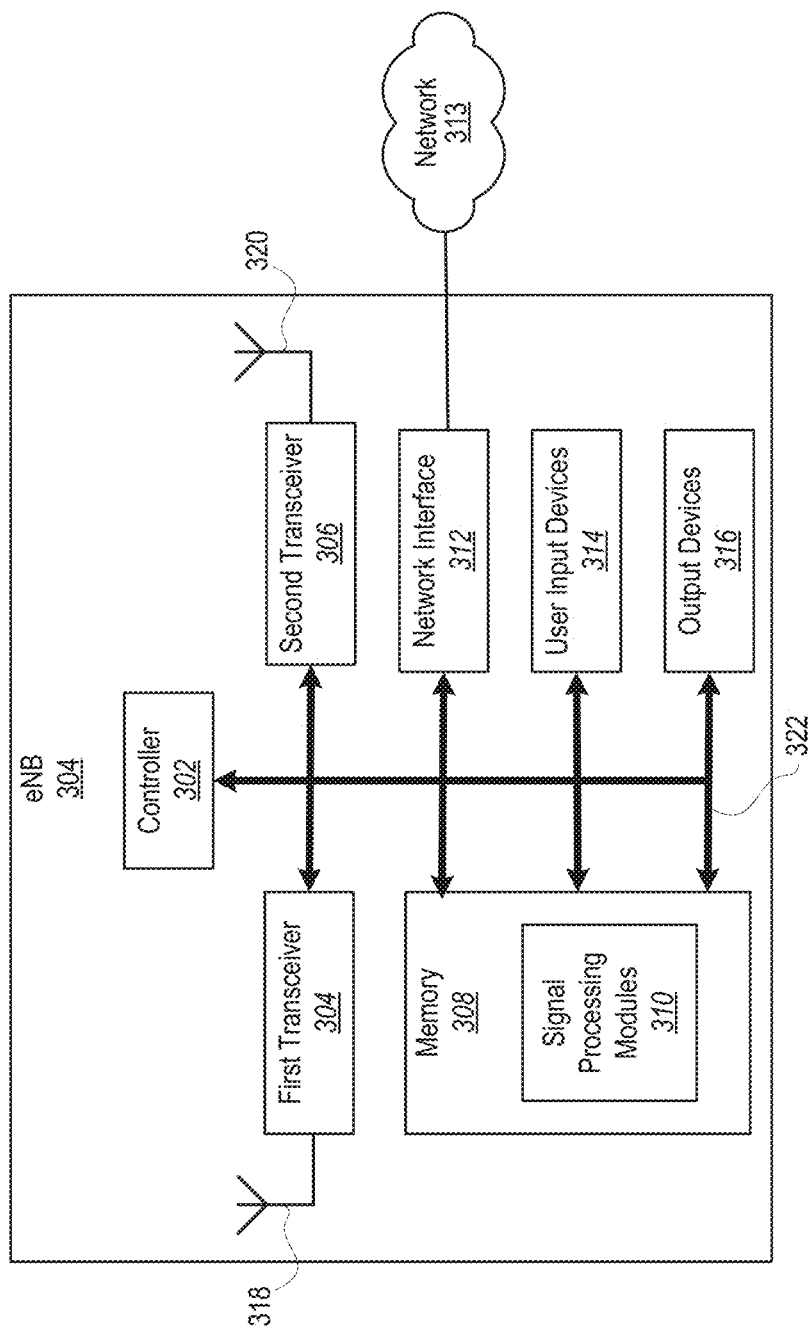
FIG. 3 illustrates an example evolved base node (eNB) having functional components for performing several of the various features of the disclosure, according to one embodiment.

FIG. 3 illustrates an example eNB 304 that includes a controller 302, a first transceiver 304 (e.g., a baseband chipset that includes a transceiver capable of communicating by radio according to a 3GPP standard), and a second transceiver 306. The device further includes a memory 308 (in which the instructions of various signal-processing modules 310 are stored), a network interface 312 (used, for example, by the eNB 304 to communicate with other parts of a network 313), user-input devices 314 (e.g., a touch-screen and a microphone), output devices 316 (e.g., a display and a speaker), and antennas 318 and 320. The memory 308 can be implemented as volatile memory, non-volatile memory, or a combination thereof. The memory 308 may be implemented in multiple physical locations and across multiple types of media (e.g., dynamic random-access memory plus a hard-disk drive). The memory 308 can also be split among multiple hardware components. In one embodiment, each of the controller 302, the first transceiver 304, and the second transceiver 306 has a separate memory, which is collectively represented by the memory 308. The controller 302 retrieves instructions (including those of the signal-processing modules 310) from the memory 308 and operates according to those instructions to carry out various functions, including providing outgoing data to and receiving incoming data from the first transceiver 304 and the second transceiver 306. Thus, when this disclosure refers to any of the signal-processing modules 310 carrying out an action, it is, in many embodiments, the controller 302 that actually carries out the action in coordination with other pieces of hardware of the device as necessary. Each of the elements of the eNB 304 is communicatively linked to the other elements via data pathways 322. Possible implementations of the data pathways 322 include wires, conductive pathways on a microchip, and wireless connections. Possible implementations of the controller 302 include a microprocessor (such as a baseband processor), a microcontroller, a digital signal processor, and a field-programmable gate array.

In one or more embodiments, a control channel can include at least one of a Physical Downlink Control Channel (PDCCH) and an Enhanced PDDCH (EPDDCH). PDCCH can be used where control signaling from an eNodeB is received by user equipment (UE) in the first, first two, or first three, or first four symbols of a subframe, subsequently referred to as control symbols. The remaining symbols in the subframe, following the control symbols, are typically used for receiving user data. User data is received by the UE on the Physical Downlink Shared Channel (PDSCH), and in select Resource Blocks (RBs) of the PDSCH occupying either in the entire carrier bandwidth or a portion of the carrier bandwidth.

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the control channel elements (CCEs) corresponding to a PDCCH candidate of the search space $S_k^{(L)}$ are given by a formula taking parameters including: (i) Total number of CCEs in the control region of the subframe (derived from reduction of PCFICH and PHICH resources); (ii) Aggregation level; (iii) number of PDCCH candidates to monitor in the given search space; and (iv) slot number within the radio frame.

A physical control channel is transmitted on an aggregation of one or several consecutive CCEs, where a control channel element corresponds to nine (9) resource element groups. Each CCE is equivalent to thirty-six (36) resource elements (REs). One CCE is the minimum PDCCH allocation unit. The number of resource-element groups not assigned to PCFICH or PHICH is $N_{REG}$. The CCEs available in the system are numbered from 0 to $N_{CCE}-1$, where $N_{CCE} = \lfloor N_{REG}/9 \rfloor$. A PDCCH consisting of n consecutive CCEs may only start on a CCE fulfilling i mod n=0, where i is the CCE number.

For each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of a set of ECCEs numbered from 0 to $N_{ECCE,p,k}-1$ where $N_{ECCE,p,k}$ is the number of ECCEs in EPDCCH-PRB-set p of subframe k. Each EPDCCH-PRB-set can be configured for either localized EPDCCH transmission or distributed EPDCCH transmission. For each serving cell, the subframes in which the UE monitors EPDCCH UE-specific search spaces are configured by higher layers.

A UE shall monitor a set of PDCCH/EPDCCH candidates for control information, where monitoring implies attempting to decode each of the PDCCH/EPDCCH decoding candidates in the set according to the monitored downlink control information (DCI) formats. The set of PDCCH/EPDCCH candidates to monitor are defined in terms of PDCCH/EPDCCH search spaces.

To reduce latency of communication in LTE, various solutions are being studied. For example, an approach envisioned for future LTE systems is to use shorter minimum transmission time interval (TTI) (i.e., shorter than 1ms) in UL/DL. Using a shorter minimum TTI (sTTI) allows the UE to send/receive data using reduced latency when compared to current LTE systems. In addition, acknowledging each (or a group containing few) sTTI(s) leading to faster (compared to using 1ms TTI) acknowledging data can help in some applications such as TCP during slow-start phase for users in good channel conditions. For example, in the TCP slow-start phase for DL communication, the network-UE link capacity for a user in good channel condition can support more data; but the network sends a smaller amount of data because the network is waiting to receive the acknowledgment for the previously sent data due to the TCP slow-start phase. Therefore, faster acknowledgments (e.g., as a result of using shorter TTI length) would enable the network to better utilize the available network-UE link capacity.

For example, scheduling UE transmission over a sTTI length of 0.5 ms (i.e., PUSCH scheduled using a PRB spanning a 0.5 ms in a 1ms subframe), or scheduling UE transmission over a sTTI length of ~140 us (i.e., PUSCH scheduled using a shortened PRB spanning 2 SC-FDMA symbols within a slot in a subframe), would not only reduce time taken to start/finish transmitting a data packet, but also potentially reduce the round trip time for possible hybrid automatic repeat request (HARD) retransmissions related to that data packet.

The PDCCH channel carries the control information about the data being transmitted on the current subframe and the information about the resources which the UE needs to use for the uplink data. That means it is mandatory for the UE to decode the control information successfully if UE intends to send some data or receive something. For reduced latency a shortened physical downlink control channel (sPDCCH) is defined to play a similar role in a sTTI (or a group of sTTIs). For PDCCH, allocation of resources happens in terms of CCE (Control Channel Elements) which is equivalent to 36 Resource Elements (REs). One CCE is the minimum PDCCH allocation unit. As the sTTI length becomes smaller, the control overhead increases, which in turn increases the complexity and hence the processing delay, which could negatively impact the latency reduction offered by low-latency operation.

To reduce the control signal overhead, few general approaches are possible, including: (i) Approach 1: scheduling multiple sTTIs via a single grant (e.g., sent via an sPDCCH or PDCCH/EPDCCH command) which we refer to as multi-sTTI scheduling; (ii) Approach 2: sending the control information in a hierarchical manner, i.e., more than one step. For instance, a first step can provide a subset of control information common to a set of sTTIs at a first time instant, and a second step can provide complementary control information pertinent to each sTTI at a second time instant; and (iii) Approach 3: sending the control information in each scheduled sTTI, but with some DCI bit field reduction compared to the DCIs used for legacy 1ms-TTI. For instance, for 2-symbol sTTI, the Resource Block Group (RBG) size can be larger (e.g., 6 times) than that of used for legacy 1ms-TTI.

In addition to the above control overhead reduction techniques, to further increase the efficiency and reduce complexity of sTTI operation, the present innovation proposes to use different sPDCCH monitoring sets in different subframes based on the presence of the legacy UEs in those subframes. The eNB can exploit its knowledge regarding the usage of each subframe for legacy operation including PDCCH/EPDCCH/PDSCH/PUSCH. In particular, at the beginning of a subframe, the eNB knows how much resources are allocated to PDCCH/EPDCCH in the subframe; consequently, the eNB can indicate to a UE respective information, and the UE can monitor the corresponding monitoring sets (including search spaces) for sPDCCH operation.

In one or more embodiments, at the beginning of a 1ms-TTI, the eNB knows whether there is any UE that is going to receive an UL/DL grant for 1ms operation in this TTI. Exploiting this information could bring new helpful UE behaviors for UEs operating with sTTI in the subframe (e.g., in case, no 1ms-TTI grant is sent in UE-specific search space) since:

From the UE perspective,
(i) sTTI UEs could skip decoding of PDCCH/EPDCCH decoding candidates (e.g., in UE-specific search space) devoted to legacy operation which can help in UE power saving for example; and
(ii) sTTI UEs can search for a different set of sPDCCH decoding candidates (e.g., containing more sPDCCH decoding candidates in subframes where no legacy UE scheduled keeping the same total number of blind decodes of sPDCCH plus PDCCH/EPDCCH as in other subframes wherein legacy UEs also scheduled);

From the system perspective,
(i) new sPDCCH decoding candidates can be used in resources devoted to the legacy PDCCH/EPDCCH decoding candidates, and hence more sTTI UEs could be granted in a subframe; and
(ii) sTTI UEs could be scheduled in entire bandwidth instead of the fraction of bandwidth given to sTTI UEs in the system.

According to the agreements in 3GPP, from an eNB perspective, existing non-sTTI and sTTI can be Frequency Division Multiplexed (FDM) in the same subframe in the same carrier.

Figure 4:
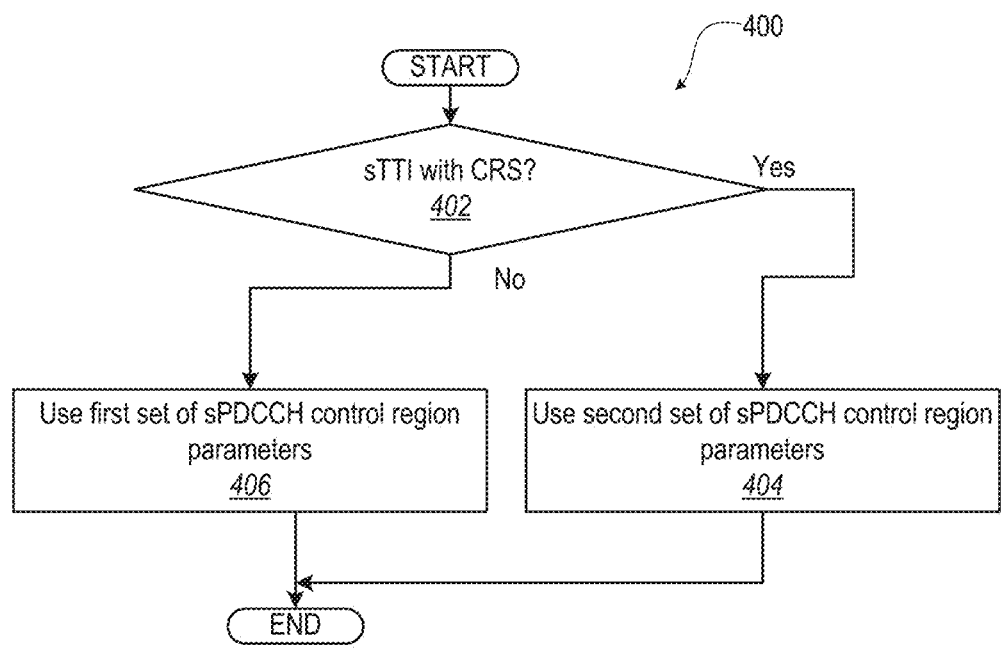
FIG. 4 illustrates a flow diagram of a method by which a UE determines Physical Downlink Control Channel (PDCCH) assignment.

FIG. 4 illustrates a flow diagram of a method 400 of UE determining PDCCH assignment. Method 400 includes UE determining whether sTTI includes CRS (decision block 402). In response to determining that sTTI includes CRS in decision block 402, UE uses second set of sPDCCH control region parameters (block 404). In response to determining that sTTI does not include CRS in decision block 402, UE uses first set of sPDCCH control region parameters (block 406). Then method 400 ends. Thus, UE may use different control region parameters in "cell-specific sPDCCH assignment" depending on the presence of CRS in an sTTI.

In one or more embodiments, UE monitors a set of sPDCCH candidates for control information, where monitoring implies attempting to decode each of the sPDCCHs in the set according to the monitored DCI formats. The set of sPDCCH candidates to monitor are defined in terms of sPDCCH search spaces. From a UE perspective, the sPDCCH assignment information can be based on one of the following design approaches: (1) 'cell-specific assignment' and (2) UE-specific assignment.

Cell-specific assignment is a design where 'cell-specific reservation for sPDCCH decoding candidates' will be signaled to the UE. For example, the cell-specific reservation, i.e., the information about the sPDCCH control region (e.g., the OFDM symbols carrying sPDCCH, the set of frequency resources allocated to sPDCCH) can be signaled to the UE in each subframe or in a set of subframes via dynamic physical layer signaling or via higher layer signaling. Based on a presence of a cell-specific reference signal (CRS) (or other type of signals such as DMRS, positioning reference symbols, CSI-RS, etc.) in an sTTI, the sPDCCH control region may be different in terms of bandwidth, aggregation level, etc.

'UE-specific assignment': a design where the UE is essentially only aware of its own sPDCCH decoding candidates (i.e., not other UEs sPDCCH decoding candidates) and assumes that resources other than those where the UE decodes the control channel are available for sPDSCH (i.e., a design where any 'cell-specific reservation for sPDCCH' can be transparent to the UE).

sPDCCH decoding candidate sets: The eNB may configure multiple sPDCCH monitoring sets for each UE (UE-specific assignment) or for a group of UEs (cell-specific assignment).

Figure 5:
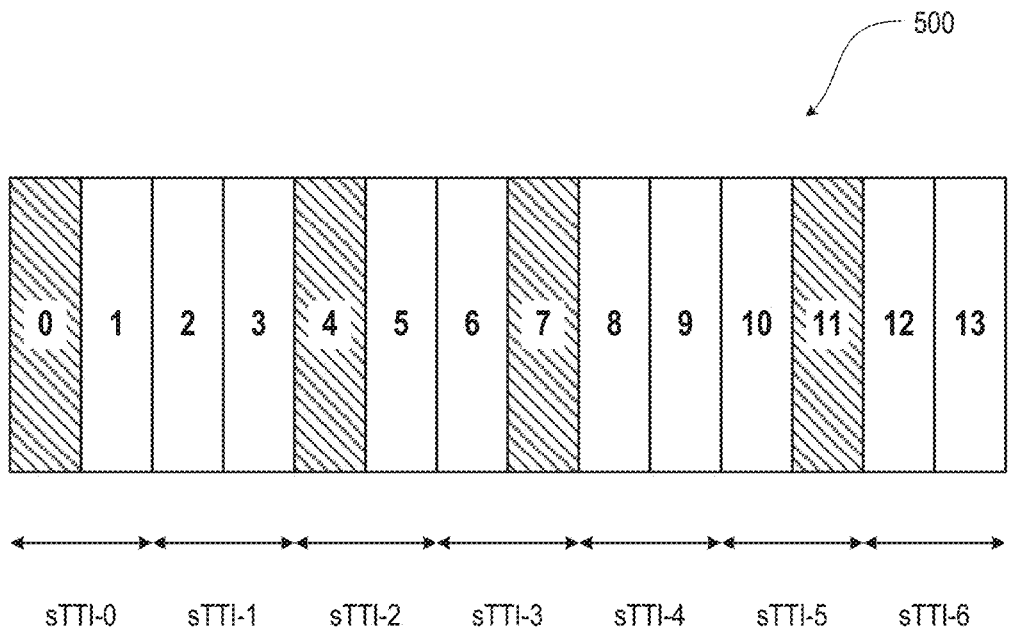
FIG. 5 illustrates a graphical representation of a subframe with seven (7) shortened Transmission Time Intervals (sTTIs), each with two (2) symbol length.

FIG. 5 illustrates a subframe 500 with 7 sTTIs, each with 2 symbol length. Assuming 2 CRS antenna ports, sTTIs 1,4, and 6 do not contain CRS, while other sTTIs (i.e., 0,2,3,5), each have 1 symbol containing CRS. TABLE 1 shows the amount of non CRS REs in a 2-symbol sTTI (2 CRS antenna ports) as a function of bandwidth (RBs) configured for sTTI operation.

TABLE 1

| # of RBs configured for sTTI operation | Available REs in a sTTI with CRS | Available REs in a sTTI without CRS |
| --- | --- | --- |
| 6 | 120 | 144 |
| 15 | 300 | 360 |
| 25 | 500 | 600 |
| 50 | 1000 | 1200 |
| 75 | 1500 | 1800 |
| 100 | 2000 | 2400 |

Figure 6:
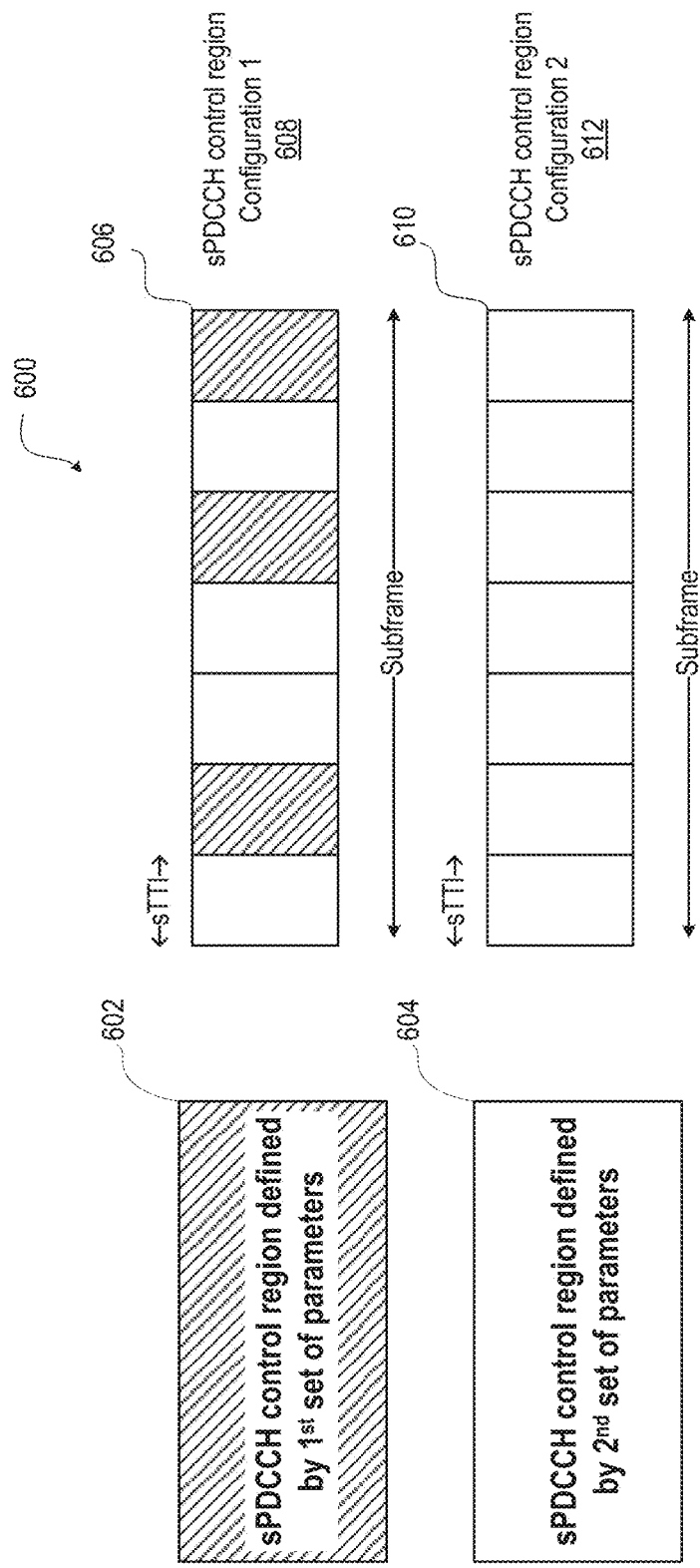
FIG. 6 illustrates a graphical representation of a control channel transmitted by an evolved Node B (eNB) indicating different control region parameters for different sTTIs in a subframe.

FIG. 6 illustrates an example of a control channel 600 transmitted by an eNB indicating different control region parameters 602, 604 for different sTTIs for instance in a subframe; as an example for subframe 1 606, sPDCCH control region configuration 1 608 and in subframe 2 610, configuration 2 612. It is also possible to indicate to the UE(s) which sTTIs use which sPDCCH configuration (or control region); for instance a bit-field or an index to a possible combination.

The parameters of different sets of control region can be signaled by higher layer signaling. Alternatively, the offset to the configuration where CRS (or other type of signals such as DMRS, positioning reference symbols, CSI-RS, etc.) is present in an sTTI can be fixed in specifications: e.g., In CRS containing sTTIs, sPDCCH decoding candidates with aggregation levels larger than 4 are not allowed, and the same number of sPDCCH decoding candidates with aggregation levels less than 4 exist in sTTIs with and without CRS.

For each serving cell, higher layer signaling can configure a UE with one or multiple (e.g., two) sPDCCH-PRB-sets for sPDCCH monitoring (similar to LTE EPDCCH design). Each sPDCCH-PRB-set consists of a set of shortened control channel elements (sCCEs), which are similar to the notion of CCE but tailored for sTTI with a particular TTI length. The PRB-pairs corresponding to an sPDCCH-PRB-set are indicated by higher layers (MAC or RRC) or by dynamic control signaling. An approach detailed in the following is to configure PRBs for each sPDCCH-PRB-set via higher layers, and then use dynamic signaling to indicate which sPDCCH-PRB-set(s) is to be used by the UE for sPDCCH monitoring.

Figure 7:
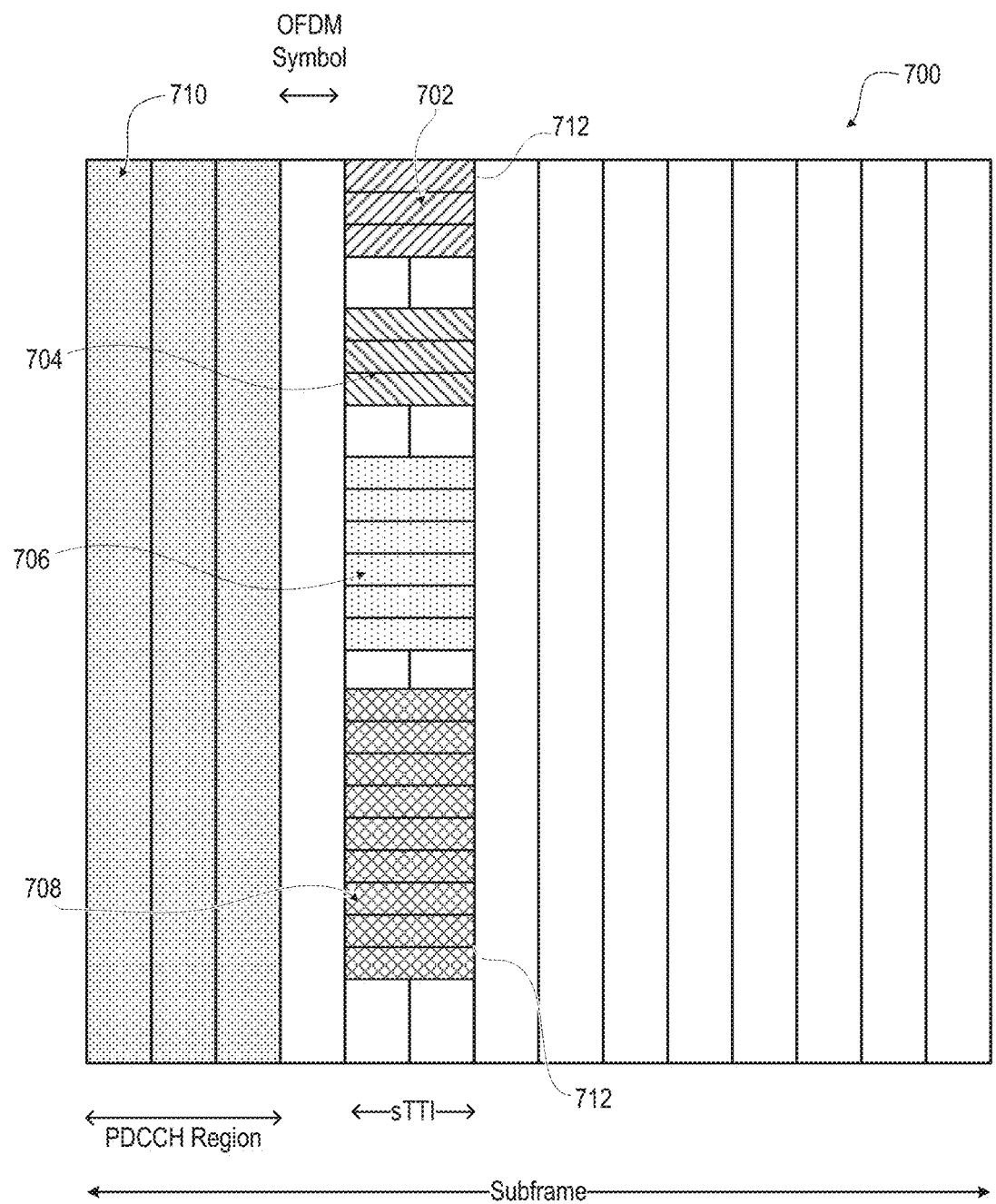
FIG. 7 illustrates a graphical representation of a downlink channel having four (4) physical resource block (PRB)-sets for a UE that is configured via higher layer signaling.

For example, FIG. 7 illustrates a downlink channel 700 having four (4) PRB-sets 702, 704, 706, 708 that follow a PDCCH region 710 for a UE that is configured by higher layer signaling. In particular, first PRB-set 702 is configured to include three (3) PRBs 712. Second PRB-set 704 is configured to include three (3) PRBs 712. Third PRB-set 706 is configured to include six (6) PRBs 712. Fourth PRB-set 708 is configured to include nine (9) PRBs 712. Then physical layer signaling (first DCI level) indicates which PRB-sets for receiving scheduling assignments to the UE should be monitored by the UE in a subframe containing multiple sTTIs (e.g., 7 sTTIs).

Figure 8:
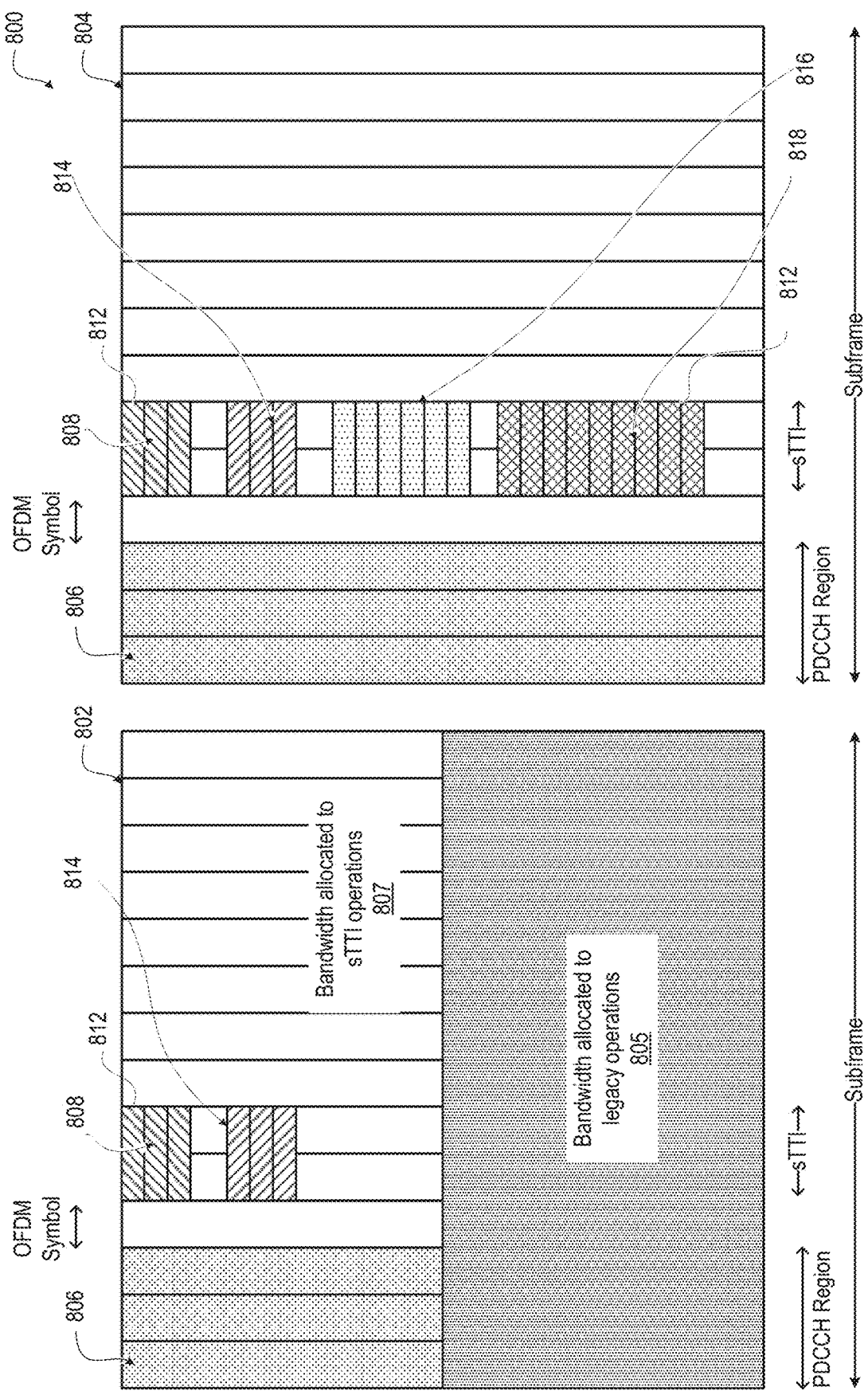
FIG. 8 illustrates a graphical representation of a subframe having two shortened PDDCH (sPDCCH) PRB-sets, where the second set is a subset of the first set.

FIG. 8 illustrates a downlink channel 800 having a first subframe 802 and a second subframe 804, each beginning with a PDCCH region 806 respectively. In this instance, eNB in the PDCCH region 806 of subframe 1 802 can indicate first PRB-set 808 having three (3) PRBs 812 and second PRB-set 814 having three (3) PRBs 812 are to be monitored. eNB in the PDCCH region 806 of subframe 2 804 can indicate that all PRB sets 808, 814, 816, 818 are to be monitored, including third PRB-set 816 having six (6) PRBs 812 and fourth PRB-set 818 having nine (9) PRBs 812. FIG. 8 illustrates an example of indication of different PRB-sets to be monitored by the UE for sPDCCH blind decoding from a set of configured PRB-sets for monitoring sPDCCH.

Figure 9:
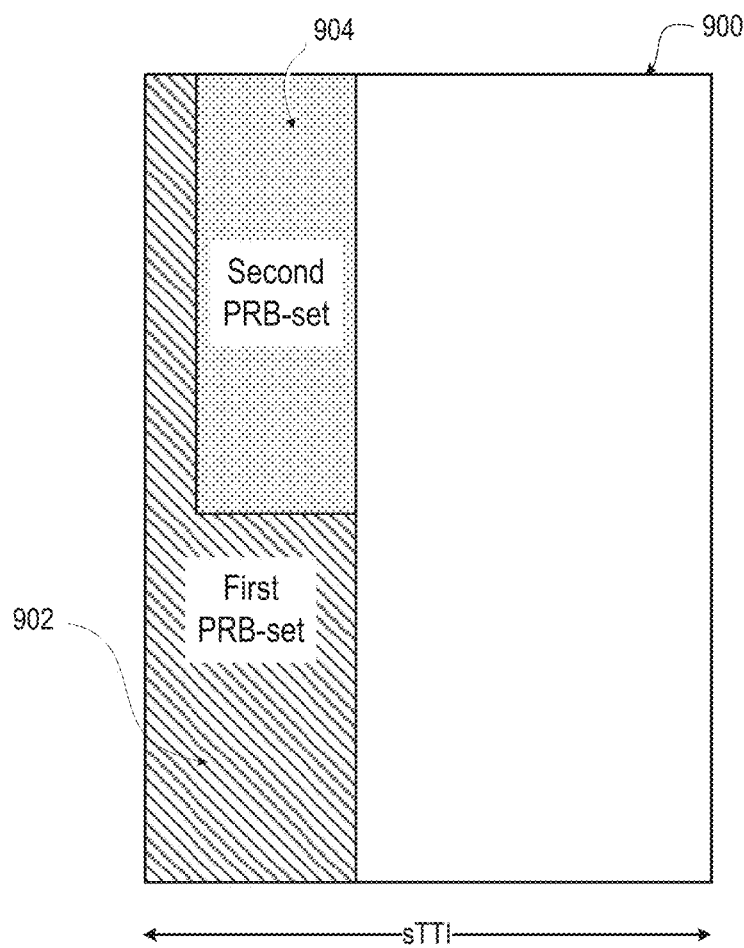
FIG. 9 illustrates a subframe with two sPDCCH-PRB-sets, where the second set is a subset of the first set.

Dimensioning sPDCCH decoding candidate sets can include overlaps. FIG. 9 illustrates subframe 900 where there exist two sPDCCH-PRB-sets 902, 904. The second sPDCCH-PRB-set 904 is a subset of the first sPDCCH-PRB-set 902. A UE performs blind decoding over the BD candidates of second PDCCH-PRB-set 904 if indicated; otherwise first sPDCCH-PRB-set 902 is used for control channel monitoring. Both sPDCCH-PRB-sets 902, 904 could be configured by higher layers. Each of sPDCCH-PRB-set 902, 904 may include sPDCCH decoding candidates that do not belong to other sets.

Dimensioning sPDCCH decoding candidate sets can include decoding candidates with smaller number of sCCE (e.g., 1 or 2) as default decoding candidate sets. Upon receiving the set indication, decoding candidate sets with larger number of sCCE (e.g., 4, and 8) can also be monitored. For instance, in FIG. 9, the non-overlapping part of set 1 may include decoding candidates with larger number of sCCEs. FIG. 7 is an example of BD candidates in a sTTI, where set 2 is a subset of set 1. For set 1, the whole BW can be utilized if no legacy UE is scheduled and set 2 can be utilized when the BW is shared between legacy and sTTI operation.

Figure 10:
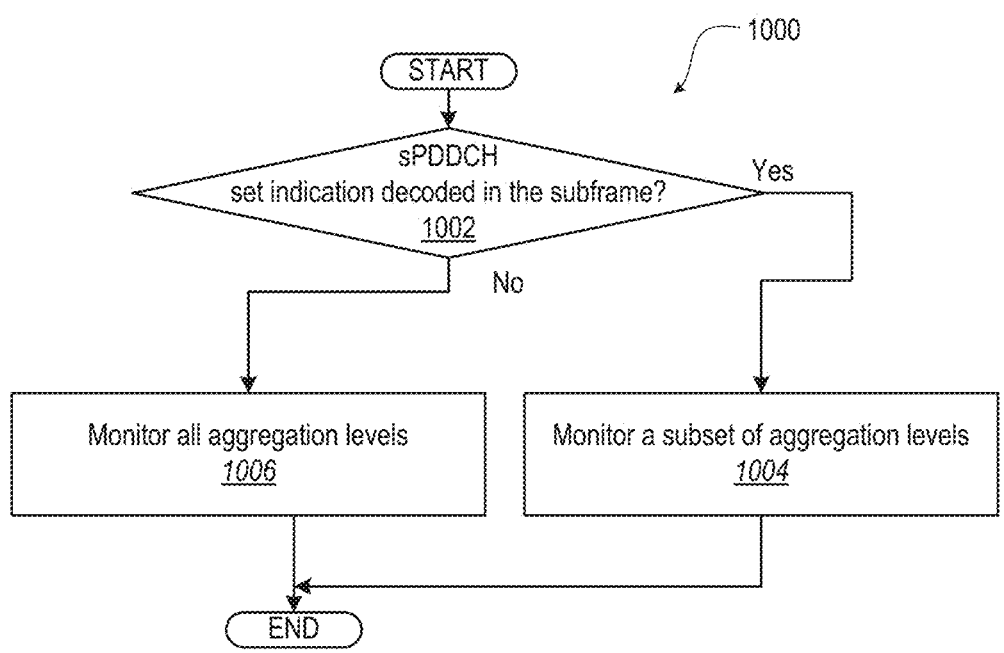
FIG. 10 illustrates a block diagram of a method performed by a UE for monitoring sPDCCH candidates, according to one or more embodiments.

FIG. 10 illustrates a method 1000 performed by the UE for monitoring sPDCCH candidates, which can be different among sTTIs or subframes. Method 1000 includes determining whether sPDCCH set indication is decoded in the subframe (decision block 1002). In response to the determination in decision block 1002 that sPDCCH set indication is decoded in the subframe, method 1000 includes monitoring a subset of aggregation levels (block 1004). Then method 1000 ends. In response to the determination in decision block 1002 that sPDCCH set indication is not decoded in the subframe, method 1000 includes monitoring all aggregation levels (block 1006). Then method 1000 ends. For example, FIG. 5 illustrates a subframe 500 having four (4) sTTIs out of 7 sTTIs include one OFDM symbol containing CRS, which could limit the amount of available resources. e.g., for MBSFN and Non-MBSFN subframes. Returning to FIG. 10, method 1000 is also an example of non-overlapping part of set 1 that may include decoding candidates with larger number of sCCEs.

Figure 11:
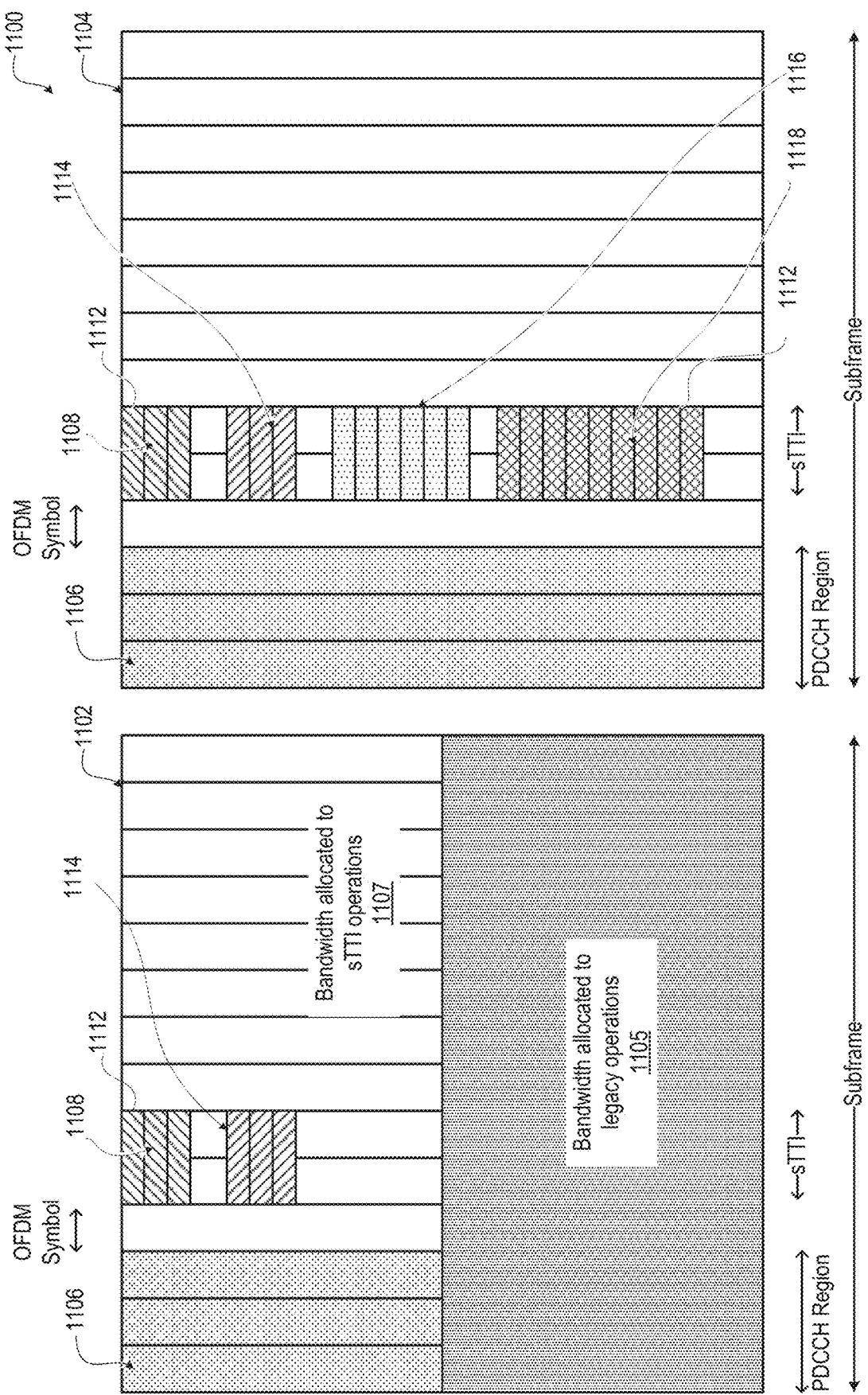
FIG. 11 illustrates a downlink channel for monitoring different PRB-sets in different subframes.

FIG. 11 illustrates a downlink channel 1100 for monitoring different PRB-sets in different subframes 1102, 1104, where first subframe 1102 has one half 1105 of the BW allocated to legacy operation, and another half 1107 for sTTI operation. Each subframe 1102, 1104 begins with a PDCCH region 1106 respectively. In this instance, eNB in the PDCCH region 1106 of subframe 1 1102 can indicate first PRB-set 1108 having three (3) PRBs 1112 and second PRB-set 1114 having three (3) PRBs 1112 are to be monitored. eNB in the PDCCH region 1106 of subframe 1 1104 can indicate that all PRB sets 1108, 1114, 1116, 1118 are to be monitored, including third PRB-set 1116 having six (6) PRBs 1112 and fourth PRB-set 1118 having nine (9) PRBs 1112. As provided, no legacy UE is scheduled in subframe 2, and hence some additional PRB-sets can be used for monitoring the sPDCCH in that subframe.

Figure 12:
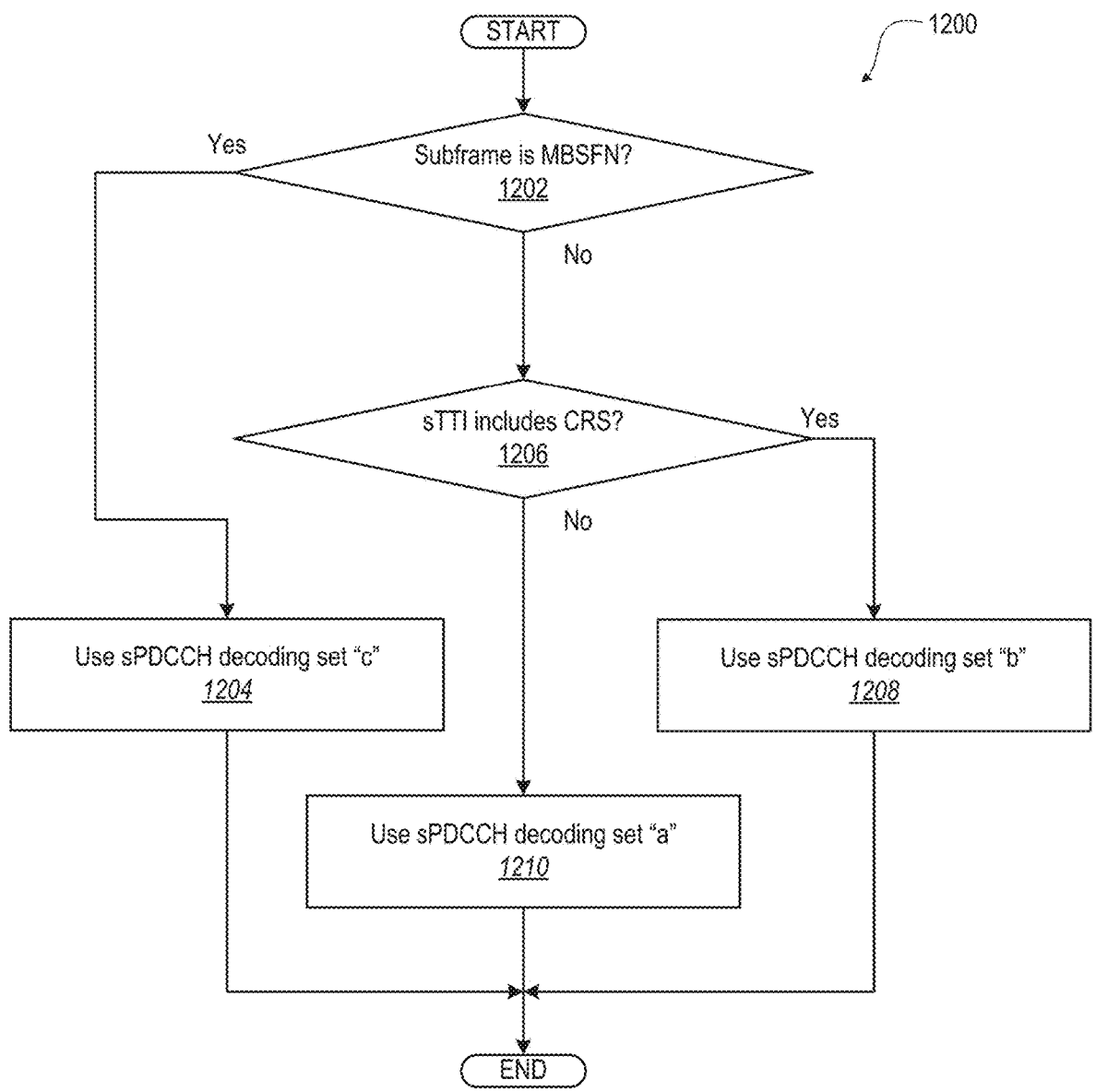
FIG. 12 illustrates a flow diagram of a method for configuring CCEs based on whether any Licensed-Assist Access (LAA) small cell (Scell) is configured for any UE in the cell.

FIG. 12 illustrates a method 1200 for configuring CCEs based on whether any Licensed-Assist Access (LAA) small cell (Scell) is configured for any UE in the cell. Method 1200 includes determining whether subframe is for Multicast Broadcast Single Frequency Network (MBSFN) (decision block 1202). In response to the determination that the subframe is MBSFN in decision block 1202, method 1200 includes using sPDCCH decoding set "c" (block 1204). Then method 1200 ends. In response to the determination that the subframe is not MBSFN in decision block 1202, method 1200 includes further determining whether the sTTI includes CRS (decision block 1206). In response to the determination that the sTTI includes CRS in decision block 1206, method 1200 includes using sPDCCH decoding set "b" (block 1208). Then method 1200 ends. In response to the determination that the sTTI does not include CRS in decision block 1206, method 1200 includes using sPDCCH decoding set "a" (block 1210). Then method 1200 ends.

Method 1200 is an example of using 2 symbol-OFDM sTTI. The method 1200 provides an example showing different decoding sets can be used for different subframe and sTTI types. Set "a" for instance, can include sPDCCH candidates with lower aggregation levels (e.g., 1 or 2) or can include smaller number of sPDCCH candidates compared to sets "b" and "c". The decoding sets can be configured for either localized sPDCCH transmission or distributed sPDCCH transmission. Also the decoding sets can be an RE-level (i.e., as a collection of REs forms an sPDCCH transmission) or an RB-level (i.e., as a collection of RBs forms an sPDCCH transmission). In case of the RB-level, it is possible to restrict having the sPDSCH corresponding to the sPDCCH not occupy REs in RBs that the sPDCCH occupies: In that case, the sPDSCH is not mapped to any physical resource-block pair(s) carrying an sPDCCH associated with the sPDSCH.

With a sPDCCH decoding candidate set indication, the PDCCH/EPDCCH can indicate which sPDCCH decoding set should be used in a subframe. With regard to transmission aspects of the sPDCCH decoding candidate set indication, eNB can indicate which sPDCCH-PRB-set(s) should be at least monitored by the UE in a subframe: (i) UE can already know candidate location(s)/size(s). For example, UE can know candidate location/s and size/s for a PDCCH candidate at a certain aggregation level L=4 with the CCEs corresponding to the PDCCH candidate given by CCEs numbered 0,1,2,3, which is similar to existing LTE-LAA design. In another example, the CCE numbers can be configurable to allow simultaneous operation of LAA and sTTI in a cell. A single aggregation level or multiple aggregation levels from a set of possible aggregation levels (e.g., 4 and 8) can be used for the decoding candidate (for indicating an sPDCCH-PRB-set). The number and value of aggregation level(s) can be configurable via higher layer signaling.

Figure 13:
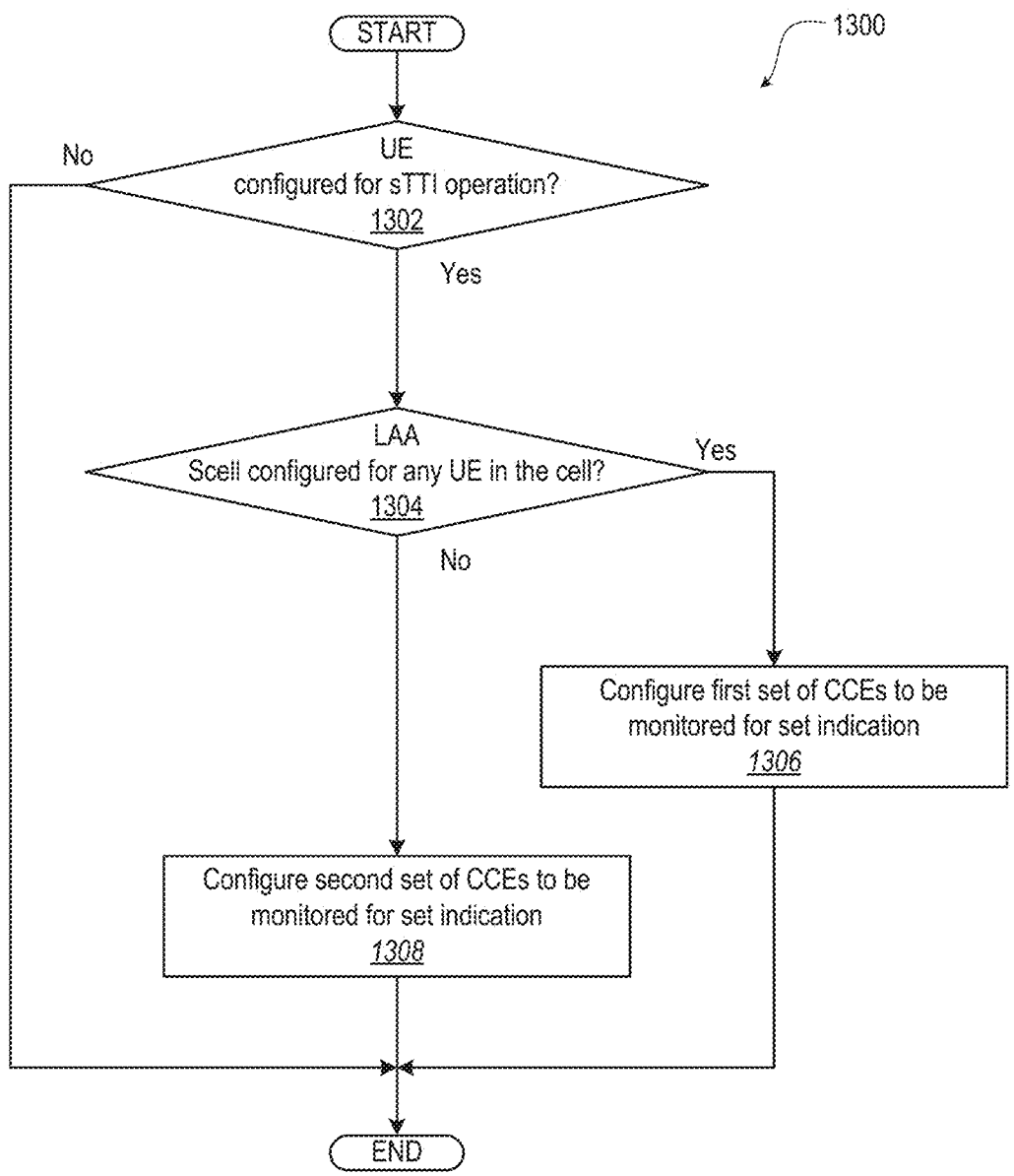
FIG. 13 illustrates a flow diagram of a method for implementing an eNB procedure to configure CCEs to monitor PDCCH for an indication of a sPDCCH decoding set.

FIG. 13 illustrates a method 1300 for an eNB procedure to configure CCEs for monitoring a PDCCH indicating a sPDCCH decoding set. Method 1300 includes determining whether a UE is configured for sTTI operation (decision block 1302). In response to the determination that the UE is not configured for sTTI operation in decision block 1302, method 1300 ends. In response to the determination that the UE is configured for sTTI operation in decision block 1302, method 1300 includes further determining whether LAA Scell is configured for any UE in the cell (decision block 1304). In response to the determination that LAA Scell is configured for any UE in the cell in decision block 1304, method 1300 includes configuring first set of CCEs to be monitored for set indication. Then method 1300 ends. In response to the determination that LAA Scell is not configured for any UE in the cell in decision block 1304, method 1300 includes configuring second set of CCEs to be monitored for set indication. Then method 1300 ends.

With further regard to transmission aspects of the sPDCCH decoding candidate set indication, eNB can indicate which sPDCCH-PRB-set(s) should be at least monitored by the UE in a subframe: (ii) will not be monitored in subframes indicated by higher layer signaling, for example, in subframes set aside for lms-TTI operation only; (iii) can include DCI size similar to DCI Format 1C; (iv) can have the DCI cyclic redundancy check (CRC) scrambled by a cell-sTTI-specific RNTI. For example, all sTTI UEs in the cell (e.g., 2-symbol and 0.5 ms) would monitor the set-indication candidate. Alternative to cell-sTTI-specific RNTI, a field in DCI can distinguish where this indication belongs to. eNB can indicate which sPDCCH-PRB-set(s) should be at least monitored by the UE in a subframe: (v) instead of a subframe level indication, a TTI-level indication is also possible, where a TTI can take any TTI value allowed in the system larger than the sTTI value the UE is configured with. For example, the UE may be configured with 2-symbol-sTTI, but there could be other UEs in the cell configured with 0.5 ms-sTTI. As a result, the UE may be configured to monitor sPDCCH decoding set indication in each slot, as shown in FIG. 14.

Figure 14:
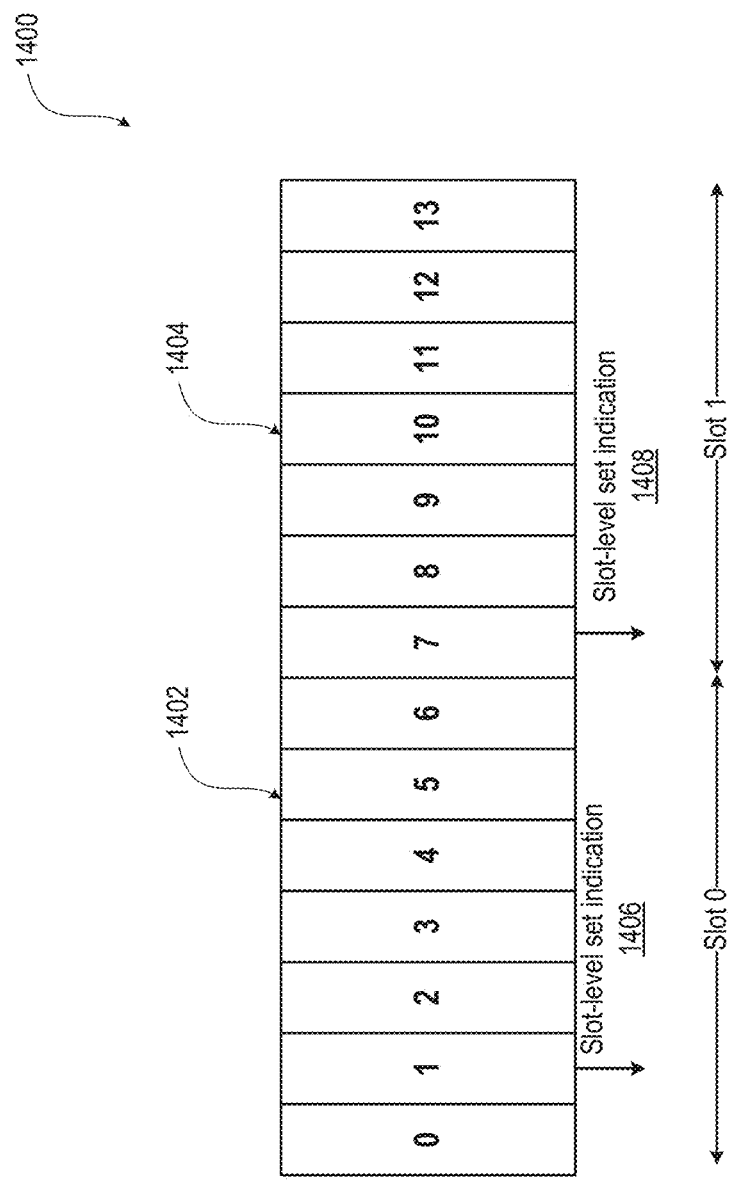
FIG. 14 illustrates a flow diagram of a method of slot-level sPDCCH monitoring set indication.

FIG. 14 illustrates a subframe 1400 that in turn includes first slot 1402 and second slot 1404. Slot-level sPDCCH that are configured for monitoring set indication that is valid for the slot duration. In the illustrated example, sTTI UEs with sTTI length of 0.5 ms and 2-symbol would monitor slot-level set indication 1406 in the first slot of the subframe 1400, However, set indication 1408 in the second slot is only monitored by 2-symbol-sTTI UEs.

One aspect provides contents/implications of a sPDCCH decoding candidate set indication. According to one embodiment, the set indication can indicate one or more of the following:

(i) sPDCCH decoding set indices to be monitored in a subframe/TTI. There could be more than one set to be monitored in the subframe/TTI. The indication could be in bit-map form to inform the UE which sets should be used;

(ii) a fraction of system BW to be used for sPDSCH/sPDCCH/sPUSCH/sPUCCH transmissions, wherein sPUSCH refers to shortened physical uplink shared channel and sPUCCH refers to shorted physical uplink control channel;

(iii) New time division duplex (TDD) configurations (compared to the existing TDD configurations) with subframes having one or multiple UL/DL switching points; and/or (iv) a number of scheduled lms UEs, and allocation of each/total allocation; and (v) a PDCCH order.

Figure 15:
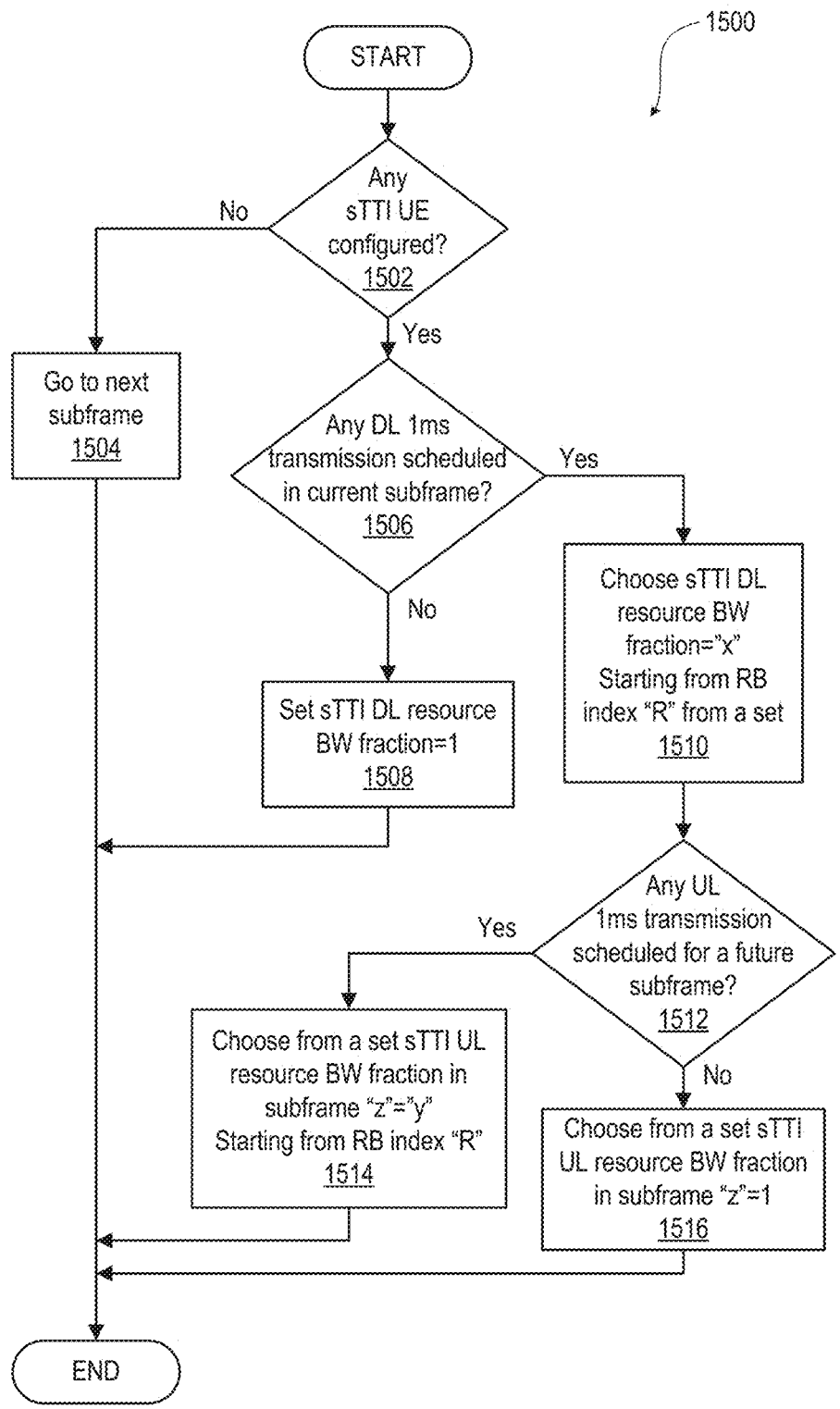
FIG. 15 illustrates a flow diagram of an example method performed by the eNB to indicate the fraction for sTTI operation.

FIG. 15 illustrates an example of a method 1500 performed by the eNB to indicate the fraction for sTTI operation. Method 1500 includes determining whether any sTTI UE is configured (decision block 1502). In response to determining that none of the sTTI UEs is configured in decision block 1502, method 1500 includes going to next subframe (block 1504). Then method 1500 ends. In response to determining that an sTTI UE is configured in decision block 1502, method 1500 includes further determining whether any downlink (DL) 1-ms transmission is scheduled in the current subframe (decision block 1506). In response to determining that any DL 1-ms transmission is not scheduled in the current subframe in decision block 1506, method 1500 includes setting sTTI DL resource BW fraction equal to 1 (block 1508). Then method 1500 ends. In response to determining that a DL 1-ms transmission is scheduled in the current subframe in decision block 1506, method 1500 includes choosing sTTI DL resource BW fraction equal to "x" starting from resource block (RB) index "R" from a set (block 1510). Method 1500 includes determining whether any uplink (UL) 1-ms transmission is scheduled for a future subframe (decision block 1512). In response to determining that a UL 1-ms transmission is scheduled for a future subframe in decision block 1512, method 1500 includes choosing from a set sTTI UL resource BW fraction in subframe with "z" equal to "y" starting from RB index "R" (block 1514). Then method 1500 ends. In response to determining that a UL 1-ms transmission is not scheduled for a future subframe, method 1500 includes choosing from a set sTTI UL resource BW fraction in subframe with "z" equal to 1 (block 1516). Then method 1500 ends.

According to one alternate embodiment, which is an alternative to indicating the fraction, the fraction can be derived from the indicated sPDCCH decoding set(s). An additional offset can be signaled in the indication to UE(s) indicating where the BW for sTTI operation starts. The indication may contain a time stamp as to when the fraction of system BW for sPUSCH/SPUCCH is applied to. The eNB can send the indication when it makes a decision to schedule/not schedule any lms-PUSCH/PUCCH transmissions for either of a legacy 1-ms transmission or 1-ms transmissions with reduced processing timing. In case of legacy 1-ms transmissions, the time-stamp can be "4". In case of 1-ms transmissions with reduced processing timing, the time stamp can be smaller.

From the UE perspective, the fraction of the system BW at an UL subframe for sPUSCH/sPUCCH can be based on the BW fraction indicated with the smallest time-stamp. Alternatively, the fraction can be derived based on a formula (e.g., the summation) taking into account the BW fractions given corresponding to indications sent with multiple time-stamps pointing to the same UL subframe.

Figure 16:
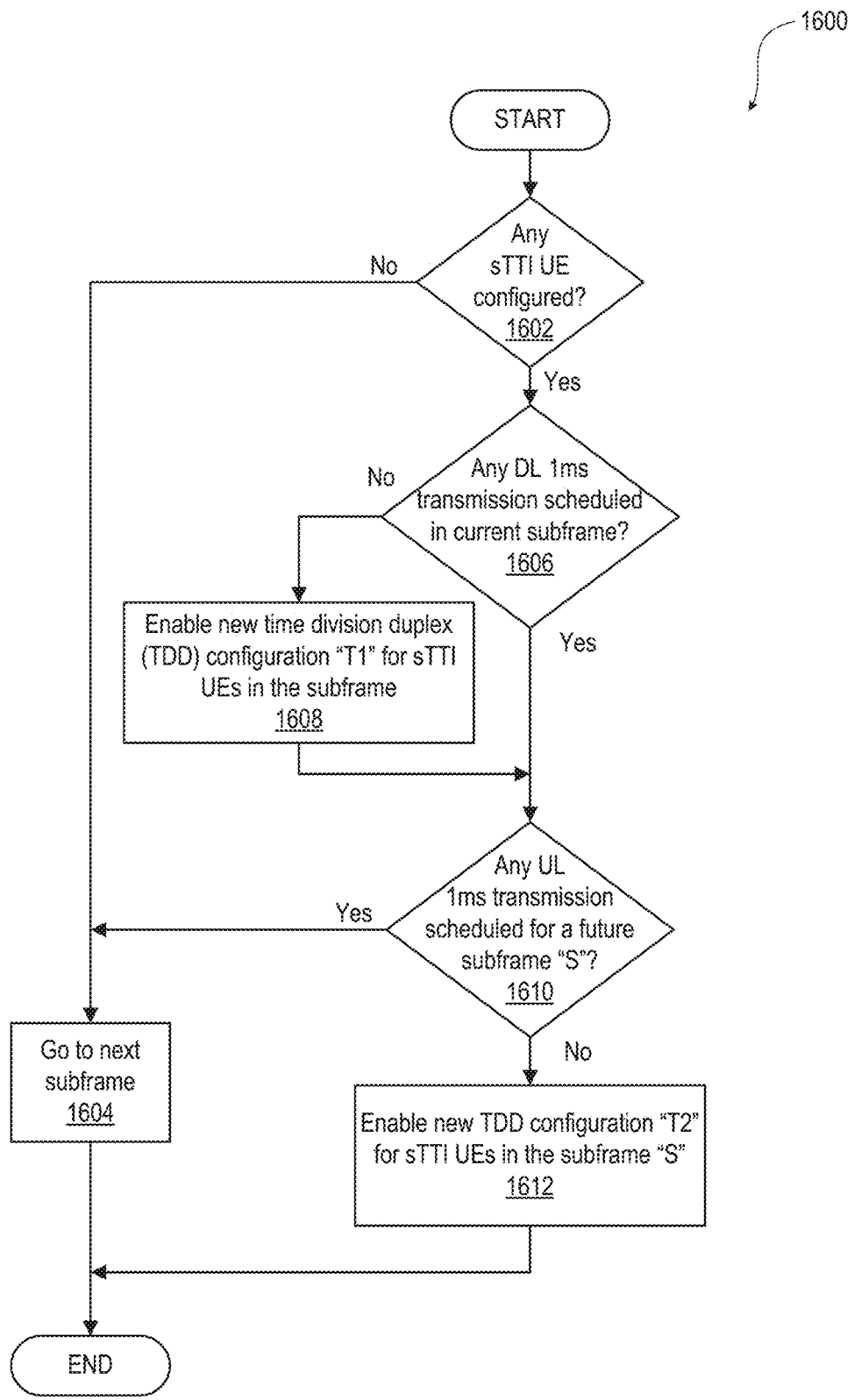
FIG. 16 illustrates a flow diagram of an example method performed by an eNB to indicate new time division duplex (TDD) configuration for sTTI UEs inside a subframe.

FIG. 16 illustrates an example method 1600 performed by an eNB to indicate a new TDD configuration for sTTI UEs inside a subframe. Method 1600 includes determining whether any sTTI UE is configured (decision block 1602). In response to determining that none of the sTTI UE is configured in decision block 1602, method 1600 includes going to a next subframe (block 1604). Then method 1600 ends. In response to determining that an sTTI UE is configured in decision block 1602, method 1600 includes determining whether any DL 1-ms transmission is scheduled in the current subframe (decision block 1606). In response to determining that a DL 1-ms transmission is not scheduled in the current subframe in decision block 1606, method 1600 includes enabling a new time division duplex (TDD) configuration "T1" for sTTI UEs in the subframe (block 1608). Then, method 1600 includes determining whether any UL 1-ms transmission is scheduled for a future subframe "S" (decision block 1610). In response to determining that a UL 1-ms transmission is scheduled for a future subframe "S" in decision block 1610, method 1600 proceeds to the next subframe (block 1604). In response to determining that a UL 1-ms transmission is not scheduled for a future subframe "S" in decision block 1610, method 1600 includes enabling a new TDD configuration "T2" for sTTI UEs in the subframe "S" (block 1612). Then method 1600 ends. In response to determining that a DL 1-ms transmission is scheduled in the current subframe in decision block 1606, method 1600 proceeds to decision block 1610.

FIG. 14 provides an example of related eNB procedures as detailed below. For example, in FIG. 9, the indication of using decoding candidate set 2 may imply that there are only sTTI UEs scheduled in the current subframe, and therefore, there is no coexistence issue with legacy UEs (e.g., inside the cell), and hence using the new TDD configurations is possible. The indication can include additional information of the new TDD configuration (e.g., a location and a number of switching points).

According to one embodiment, the set indication indicates the UE behavior with respect to sPDCCH monitoring. In this embodiment, the UE can monitor a set of sPDCCH candidates on one or more activated serving cells as configured by higher layer signaling for control information, where monitoring implies attempting to decode each of the sPDCCHs in the set according to the monitored DCI formats. The set of sPDCCH candidates to monitor are defined in terms of sPDCCH UE-specific search spaces. If the UE successfully decodes the indication to which sPDCCH-PRB-sets shall be monitored, the UE shall monitor those sets; otherwise, all of the configured sPDCCH-PRB-sets (or a default set) shall be monitored as a fallback mode.

For each serving cell, the subframes in which the UE monitors sPDCCH UE-specific search spaces are configured by higher layers. The UE shall not monitor sPDCCH in subframes indicated by higher layers to decode Physical Multicast Channel (PMCH) with conditions for TDD ignored. The UE is not expected to monitor an sPDCCH candidate, if an sCCE corresponding to that sPDCCH candidate is mapped to a PRB pair that overlaps in frequency with a transmission of either a PBCH or primary or secondary synchronization signals or a PDSCH containing system information in the same subframe. The UE is not required to monitor the sPDCCH for the serving cell on which the sPDCCH is monitored in a subframe which is configured by higher layers to be part of a positioning reference signal occasion if the positioning reference signal occasion is only configured within MBSFN subframes and the cyclic prefix length used in subframe #0 is the normal cyclic prefix.

Additional UE configurations for sPDCCH monitoring can be supported in one embodiment. In addition to configuring a UE to use sTTI, additional configurations which can help in managing sPDCCH monitoring can be provided. For example, a UE configured for sTTI operation in DL with sTTI length "t1" could be configured by the eNB to monitor one or more sPDCCH decoding candidates corresponding to sTTI length "t2", where t1<t2<1-ms. This configuration could be useful for instance to enable slot-level sPDCCH decoding set indication as shown in FIG. 16. The configuration can be done, for example, via one of the following described schemes, referenced as embodiments 1 and 2.

According to a first embodiment, the configuration includes monitoring sPDCCH candidates in a subframe in second sTTI, third sTTI, etc., with length "t2". The UE may detect a sPDCCH in an sTTI with length "t2" (referred to as t2-sPDCCH) with a DCI CRC scrambled by an sTTI-set-indication-RNTI by monitoring the following t2-sPDCCH candidate(s) according to a DCI Format (e.g., 1C). The configuration includes one t2-sPDCCH candidate at aggregation level L=4 with the t2-sCCEs (corresponding to sTTI length of "t2") corresponding to the t2-sPDCCH candidate given by t2-sCCEs numbered 0,1,2,3. Additional candidates with other aggregation levels are possible, e.g., another t2-sPDCCH candidate at aggregation level L=8 with the t2-sCCEs corresponding to the t2-sPDCCH candidate given by t2-sCCEs numbered 0,1,2,3,4,5,6,7. Information about t2-sCCEs (e.g., information about size in REs) of "t2" should be informed to the UE using sTTI with example length "t1" via higher layers. Alternatively, the sTTI length "t2" can be signaled to the UE via higher layers if the UE is capable of deriving other parameters of t2-sPDCCH (e.g., t2-sCCE) by only knowledge of "t2" itself.

According to a second embodiment, the configuration includes monitoring EPDCCH candidates with different starting symbols in the middle of the subframe. In the existing LTE specifications, it is possible to monitor EPDCCH candidates starting in the first slot and the second slot of the subframe, according to the following from 3GPP LTE Technical Specification 36.213, Release 12, "Evolved Universal Terrestrial Radio Access (E-UTRA); Physical layer procedures": For monitoring EPDCCH candidates starting in the first slot of the subframe, the starting OFDM symbol for EPDCCH given by index lEPDCCHStart in the first slot in a subframe; For monitoring EPDCCH candidates starting in the second slot of the subframe, the starting OFDM symbol for EPDCCH given by index lEPDCCHStart in the second slot in a subframe. Using EPDCCH could incur additional processing delay as the UE needs to wait till the end of the subframe to decode the EPDCCH and then start processing the sTTI, which may not be a good option.

Figure 17:
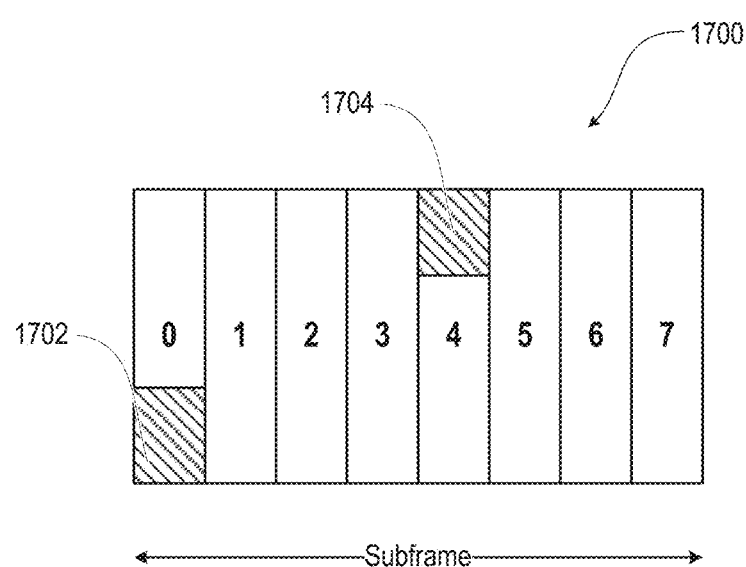
FIG. 17 illustrates special sPDCCH candidates to be used for sPDCCH decoding set indication in known sTTI indices.

Alternatively, in an extension of the second embodiment, special candidates in sTTIs with length "t1" (referred to here as t1-sPDCCH) in particular t1-sTTIs (sTTIs having "t1" length) in a subframe can carry the sPDCCH decoding set indication for t1-sTTIs. The information regarding those special candidates (such as aggregation level, sCCE indices, etc.) can be sent to the UE via higher layer signaling. The set indication sPDCCH DCI CRC is scrambled with sTTI-RNTI, which is a cell specific-RNTI for UEs configured with sTTI operation with length "t1". The sTTI indices in a subframe potentially carrying the set indication can be configured by higher layer signaling. Alternatively, the sTTI indices can be fixed in the specifications based on the different sTTI combinations in the cell. FIG. 17 illustrates special sPDCCH candidates to be used for a sPDCCH decoding set indication in known sTTI indices. For example, if a cell supports 2-symbol-sTTI, 0.5 ms-sTTI and lms-TTI, for UEs operating with 2-symbol sTTI, sTTI indices 0 and 4 of subframe 1700 may contain set indication commands 1702, 1704, as illustrated by FIG. 17. FIG. 5 illustrates a subframe 500 containing 2-symbol sTTIs (2 CRS antenna ports).

According to one embodiment, the UE can be configured with a higher/physical layer parameter to reduce the number of blind decodes (BDs) for a specific search space at aggregation level L in an sPDCCH-PRB-set. The parameter can be the same as a "pdcch-candidateReductions" parameter. If a UE is configured with higher layer parameter for pdcch-candidateReductions for a specific search space at aggregation level L in sPDCCH-PRB-set "p" for a serving cell, the corresponding number of sPDCCH candidates is a reduced number and can be derived from a formula similar to that of an EPDCCH in existing LTE specifications. The parameter, referred to here as "spdcch-candidateReductions" can be different than the pdcch-candidateReductions parameter. The spdcch-candidateReductions parameter can be dependent on various parameters, such as sTTI length number of carriers configured for sTTI operation.

As an overall design example, an eNB configures UE1 to operate in sTTI mode with 2-symbol-TTI in DL. In a subframe, if the eNB does not schedule a lms-TTI DL transmission, in a known PDCCH candidate in common search space, the eNB sends a cell-specific indication, referred to herein as "Ind1" to UE1. "Ind1" contains the message that no 1-ms TTI transmission is scheduled in the current subframe in this cell. Alternatively, the indication indicates which sPDCCH monitoring set to be used in the subframe is not sent when at least a 1-ms TTI transmission is scheduled. If sent, the CRC is scrambled with a group-sTTI-RNTI. The group-sTTI-RNTI applies to all UEs configured for sTTI operation with any sTTI length (i.e., 2-symbol and 0.5 ms). In every subframe where the UE1 operates with the sTTI, the UE1 monitors the PDCCH candidate to see if "Ind1" is sent.

Upon successful decoding of "Ind1", the UE monitors a set of sPDCCH candidates in the subframe, referred to as "set 1". If "Ind1" is not successfully decoded (i.e., not sent or missed), the UE monitors another set of sPDCCH candidates in the subframe, referred to as "set 2". Set1 and set2 are configured by higher layers. Each sPDCCH monitoring set in a subframe is associated with a set of resources (e.g., sTTI operation BW) used for sPDSCH operation. The set of resources are from among: (i) set 1, referencing all the system BW; and (2) set2, referencing a configured fraction of the system BW. Once the UE successfully decodes an sPDCCH from a set of sPDCCH monitoring candidates, the UE can try to decode sPDCCH.

Figure 18:
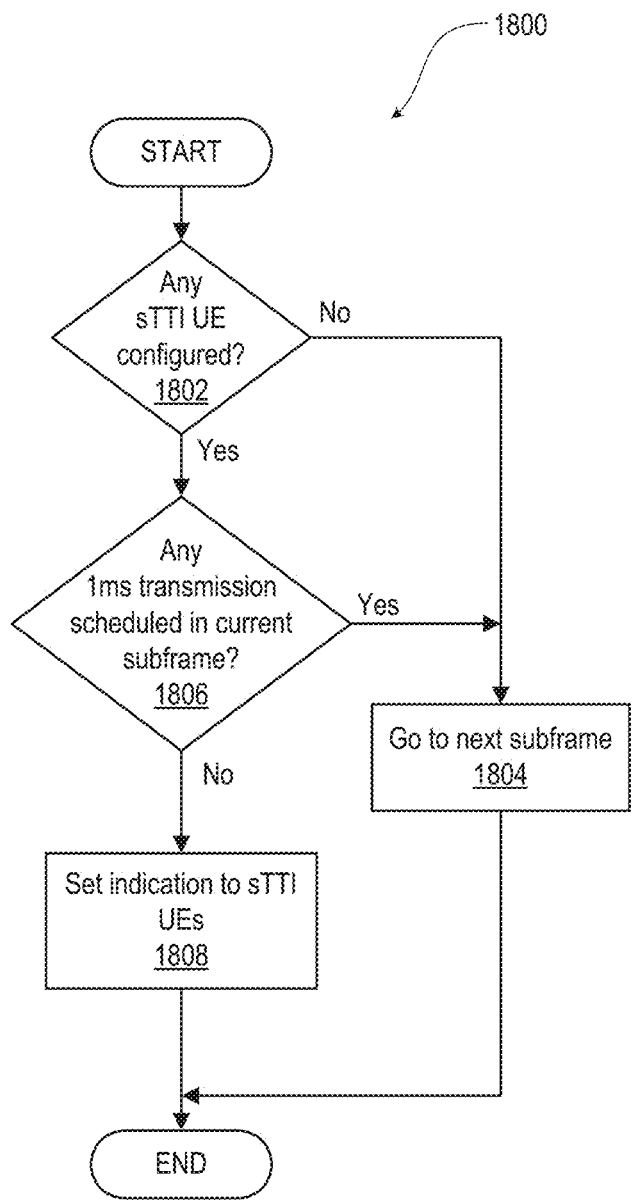
FIG. 18 illustrates a method performed by an eNB to send the sPDCCH monitoring set indication.

FIG. 18 illustrates a method 1800 performed by the eNB to send the sPDCCH monitoring set indication from the network-side. Method 1800 includes determining whether any sTTI UE is configured (decision block 1802). In response to determining that an sTTI UE is not configured in decision block 1802, method 1800 includes going to next subframe (block 1804). Then method 1800 ends. In response to determining that an sTTI UE is configured in decision block 1802, method 1800 includes determining whether any DL 1-ms transmission is scheduled in the current subframe (decision block 1806). In response to determining that a DL 1-ms transmission is not scheduled in the current subframe in decision block 1806, method 1800 includes setting indication to sTTI UEs (block 1808). Then method 1800 ends. In response to determining that an DL 1-ms transmission is scheduled in the current subframe in decision block 1806, method 1800 includes proceeding to the next subframe (block 1804). Then method 1800 ends.

Figure 19:
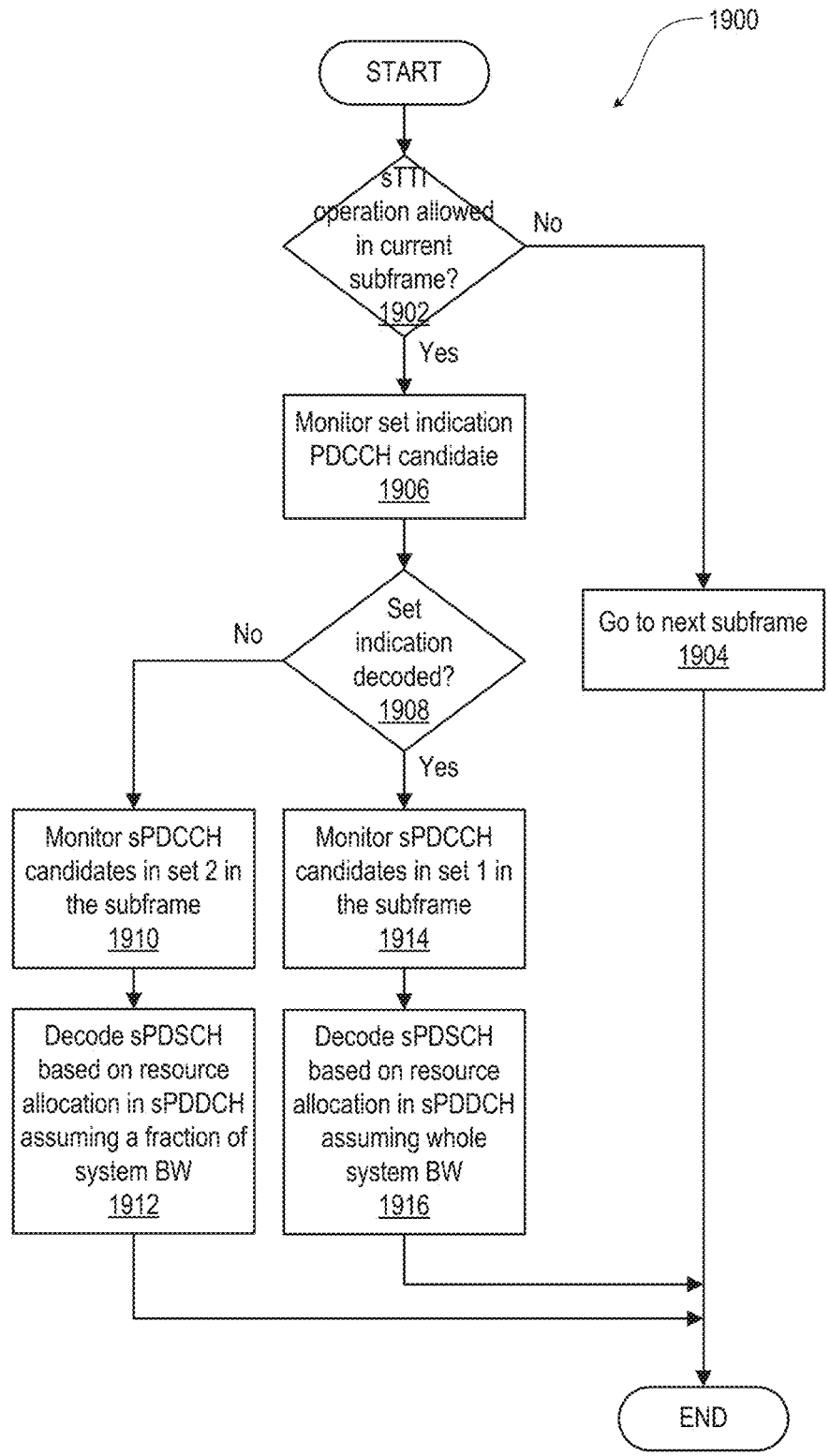
FIG. 19 illustrates a method performed by a UE to monitor sPDCCH and decode sPDSCH.

FIG. 19 illustrates a method 1900 performed within/by the UE to monitor the sPDCCH and decode the sPDSCH. Method 1900 includes determining whether sTTI operation is allowed in the subframe (decision block 1902). In response to determining that sTTI operation is not allowed in the subframe in decision block 1902, method 1900 includes going to next subframe (block 1904). Then method 1900 ends. In response to determining that sTTI operation is allowed in the subframe in decision block 1902, method 1900 includes a monitoring set indication PDCCH candidate (block 1906). Method 1900 includes determining whether a set indication is decoded (decision block 1908). In response to determining that the set indication is not decoded in decision block 1908, method 1900 includes monitoring sPDCCH candidates in set 2 in the subframe (block 1910). Method 1900 includes decoding a sPDSCH based on resource allocation in the sPDCCH assuming a fraction of system BW (block 1912). Then method 1900 ends. In response to determining that the set indication is decoded in decision block 1908, method 1900 includes monitoring sPDCCH candidates in set 1 in the subframe (block 1914). Method 1900 includes decoding a sPDSCH based on resource allocation in the sPDCCH assuming a whole system BW (block 1916). Then method 1900 ends.

Figure 20:
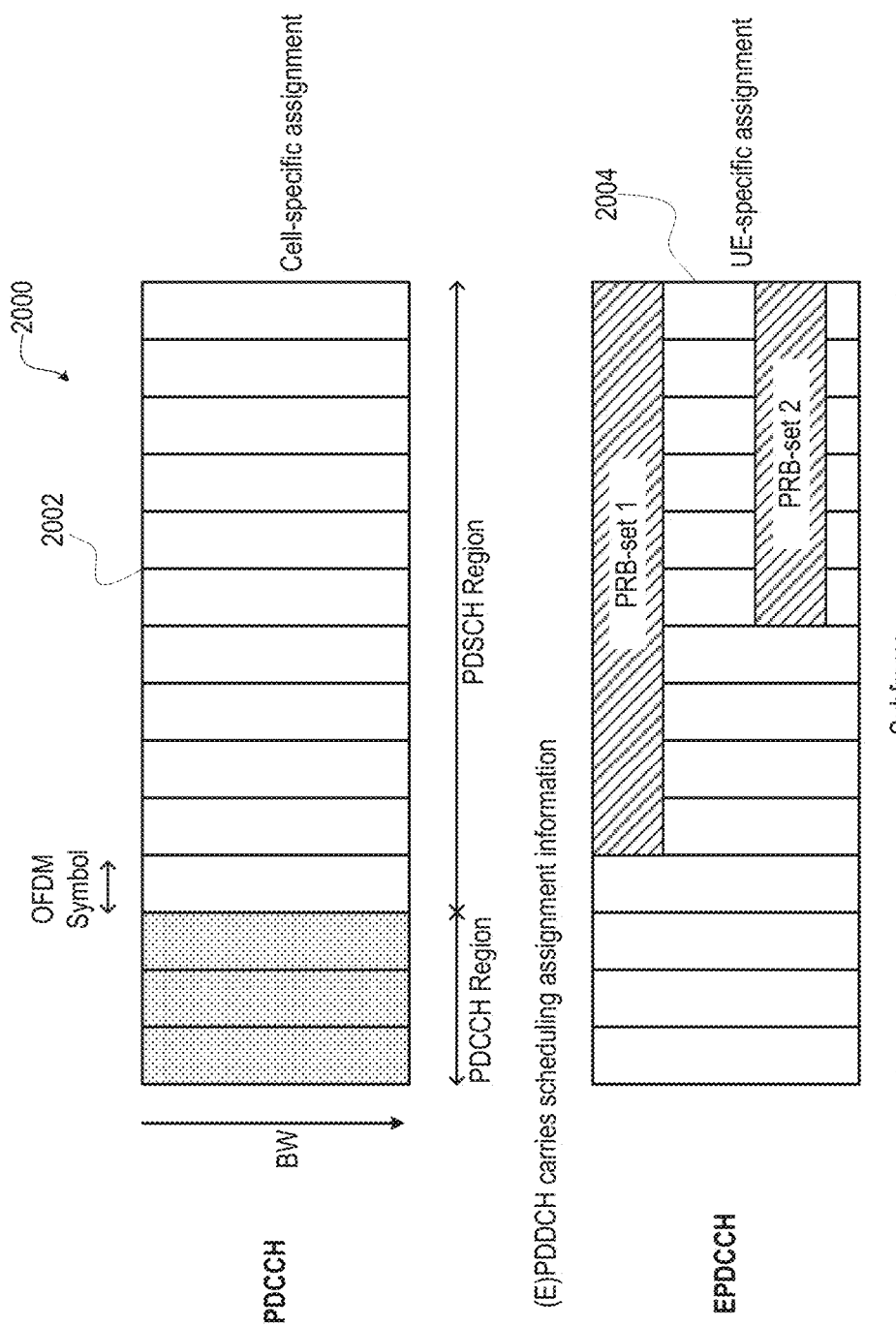
FIG. 20 illustrates a graphical representation of downlink channels including PDCCH for cell-specific assignment and EPDCCH for UE-specific assignment.
Figure 21:
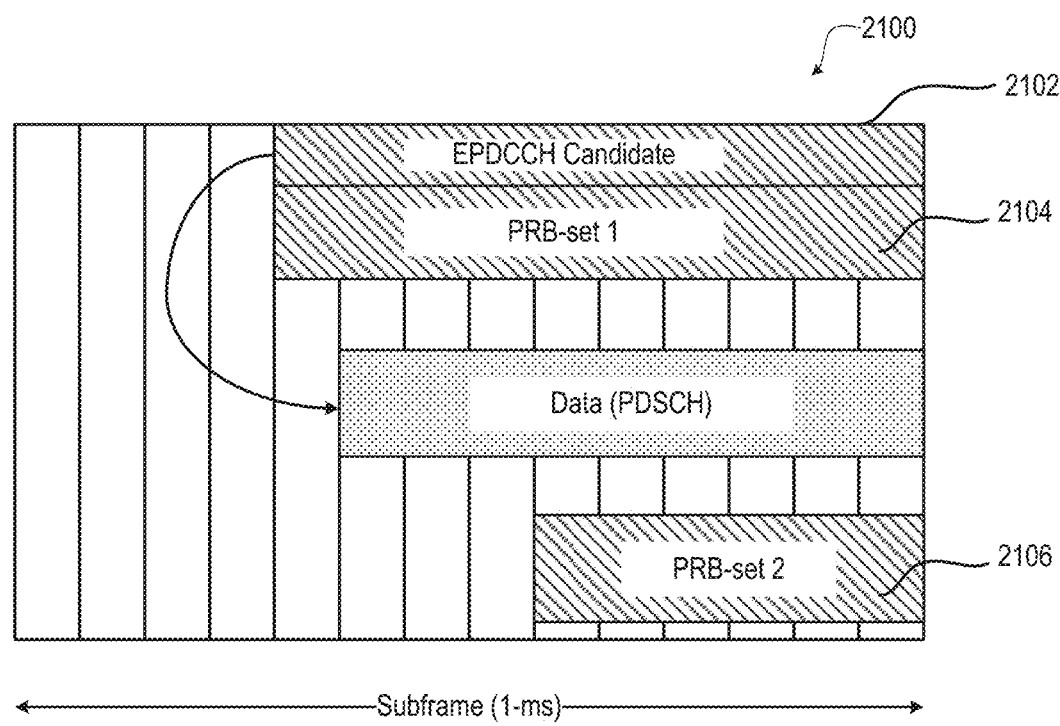
FIG. 21 illustrates a graphical representation of a subframe having an EPDDCH candidate in PRB-set 1 and PRB set 2.

In summary, FIG. 20 illustrates downlink channels 2000 including PDCCH 2002 for cell-specific assignment and EPDCCH 2004 for UE-specific assignment. The UE searches for different PDCCH/EPDCCH decoding candidates in a search-space for each candidate size in each subframe, which is referred to as aggregation level. Searching for (E)PDCCH candidate means blind decoding and checking CRC. When UE decodes the scheduling assignment, the UE can now find where the data is sent in that subframe in DL or in an associated subframe in UL. FIG. 21 illustrates a subframe 2100 having EPDDCH candidate 2102 in PRB-set 1 2104 and PRB set 2 2106. In carrier aggregation case, the pdcch-candidateReductions parameter can be used to reduce the number of blind decoding (BD) candidates. To reduce latency, lms TTI (minimum data processing unit) is changed to a smaller value (e.g., 0.5 ms, 2-symbol). It is appreciated that a lms subframe can contain multiple sTTIs (shortened TTI) as illustrated in FIG. 5.

Figure 22:
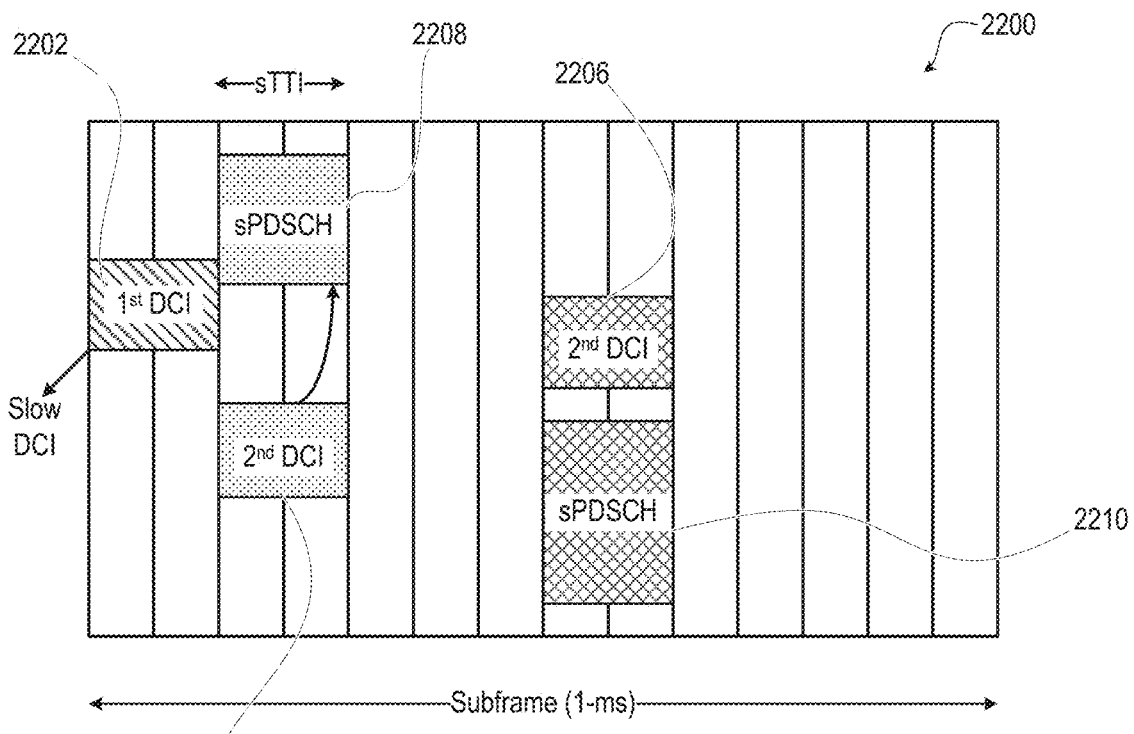
FIG. 22 illustrates a sPDCCH subframe having first downlink control information (DCI) and second DCI for indicating sPDSCH and which enables the use of sTTI with reduced overhead.

FIG. 22 illustrates a sPDCCH subframe 2200 for using sTTI with reduced overhead. The sPDCCH subframe 2200 has first DCI 2202 and second DCIs 2204, 2206 for indicating sPDSCH 2208, 2210, respectively. To schedule data in each sTTI, the sPDCCH carries scheduling assignment, controls overhead increases as TTI shortens, and controls overhead reduction schemes: As a second embodiment, the method can include sending the control information in 2 steps: (i) a similar step to the aforementioned steps for multiple sTTIs; and (ii) for each sTTI DCI, the UE decodes SPDSCH based on the first level and second level.

Figure 23:
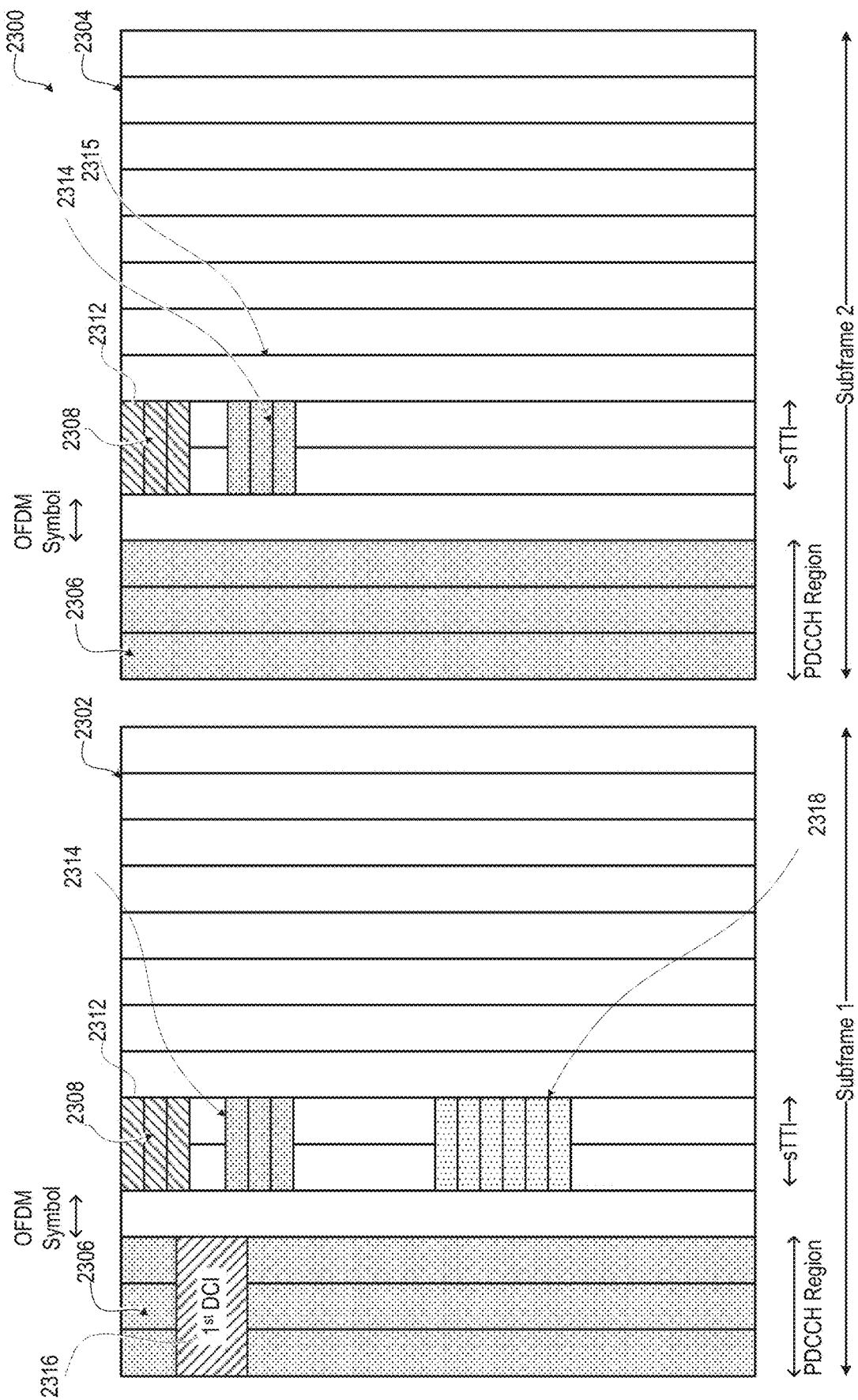
FIG. 23 illustrates graphical representation of two subframes of a downlink having default PRB sets.

By virtue of the foregoing, a first aspect of the present innovation provides for legacy PDCCH support while accommodating sTTI with reduced overhead, as illustrated in FIG. 5, where first and second DCIs can be used for sTTI UEs. In addition, if the first level is not received by the UE, the UE uses the default PRB-sets to monitor sPDCCH. For example, if in subframe 2, the first level DCI is missed, the default is monitored. For example, FIG. 23 illustrates a downlink channel 2300 having a first subframe 2302 and a second subframe 2304, each beginning with a PDCCH region 2306 respectively. In this instance, the eNB in the PDCCH region 2306 of subframe 1 2302 can indicate first PRB-set 2308 having three (3) PRBs 2312 and second PRB-set 2314 having three (3) PRBs 2312 are to be monitored. These two PRB-sets 2308, 2314 can represent default PRB sets 2315. The eNB in the PDCCH region 2306 of subframe 1 2304 can indicate in first DCI 2316 that an additional PRB-set 2318 having six (6) PRBs 2312 is to be monitored. In subframe 2 2304, the UE can miss the first DCI and thus reverts to the default PRB-sets 2308, 2314.

In another aspect, the first level DCI for a subframe indicates: (i) a number of BD for sPDCCH in the subframe, n1; (ii) a number of BD for (E)PDCCH in the subframe, n2; and (iii) n1+n2=N, where N is fixed. As one condition, n1 and n2 can change from one subframe to another, but the sum is fixed for the two subframes. Based on n1 and n2, the UE determines the sPDCCH decoding candidates.

Figure 24:
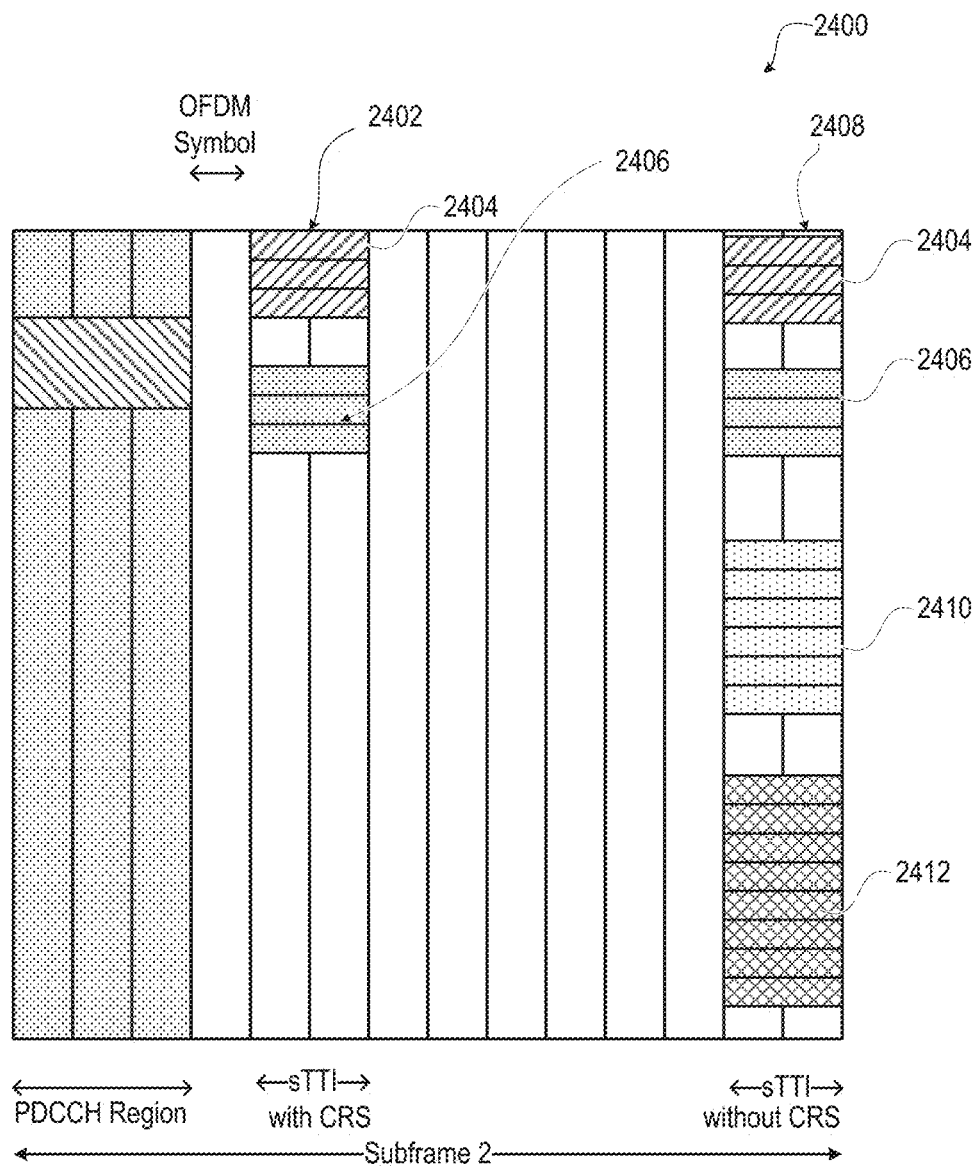
FIG. 24 illustrates a graphical representation of a subframe with a first sTTI having CRS and another sTTI not having CRS.

In an additional aspect, sTTIs of a subframe can have different sPDCCH configuration. This embodiment utilizes a same idea as with a UE-specific embodiment. Different PRB-sets can be used for different sTTIs as illustrated, for example, in FIGS. 5-6. In one or more embodiments, the configuration for an sTTI can be based on whether or not the sTTI contains CRS. FIG. 24 illustrates a subframe 2400 having a first sTTI 2402 that includes CRS, indicating that two default PRB-sets 2404, 2406 should be monitored. A second sTTI 2408 does not include CRS, indicating that PRB-sets 2404, 2406, 2410, 2412 should be monitored.

Figure 25:
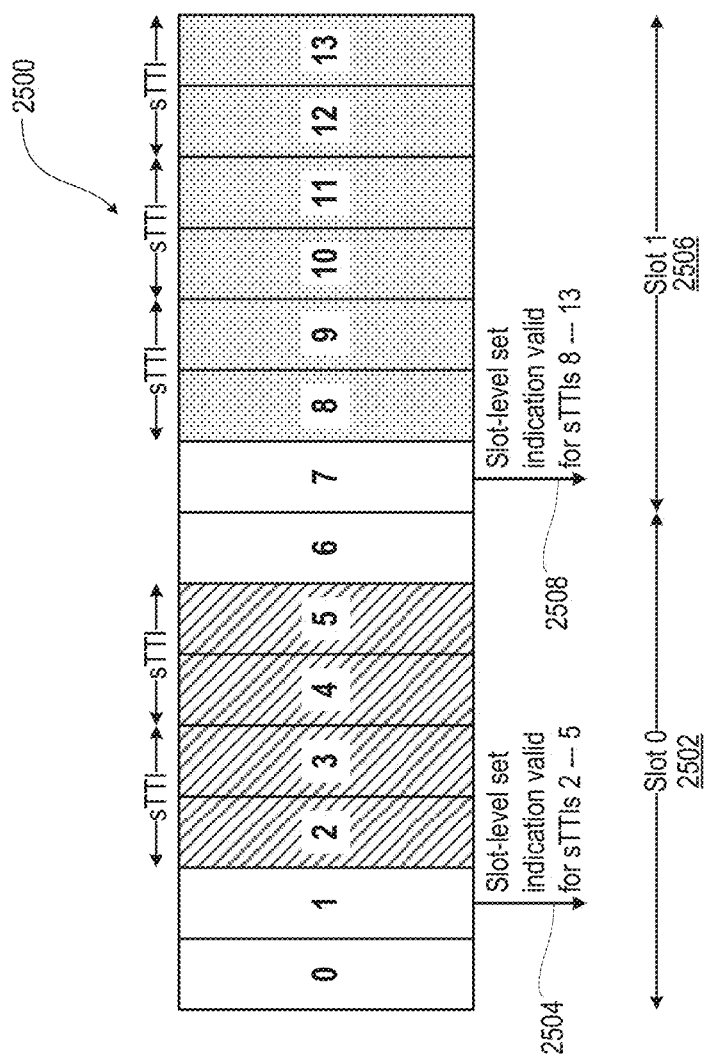
FIG. 25 illustrates a graphical representation of a subframe with a slot 0 having slot-level set indication valid for a first set of sTTIs and a slot 1 with slot-level set indication valid for another set of sTTIs.

In a further aspect, the eNB can send the set indication as a first DCI. For example, the eNB can send the set indication in a known location/s in a common search space. For another example, the eNB can send the set in some bit fields of the same DCI conveying LAA information. In addition to (or instead of) the first level DCI being sent at the beginning of the subframe, one embodiment includes the possibility of sending a slot-level indication valid for sTTIs belonging to a slot. FIG. 25 illustrates a subframe 2500 having a slot 0 2502 having slot-level set indication valid 2504 for four sTTIs 2-5 and a slot 1 2506 with slot-level set indication valid 2508 for the identified sTTIs 8-13.

Figure 26:
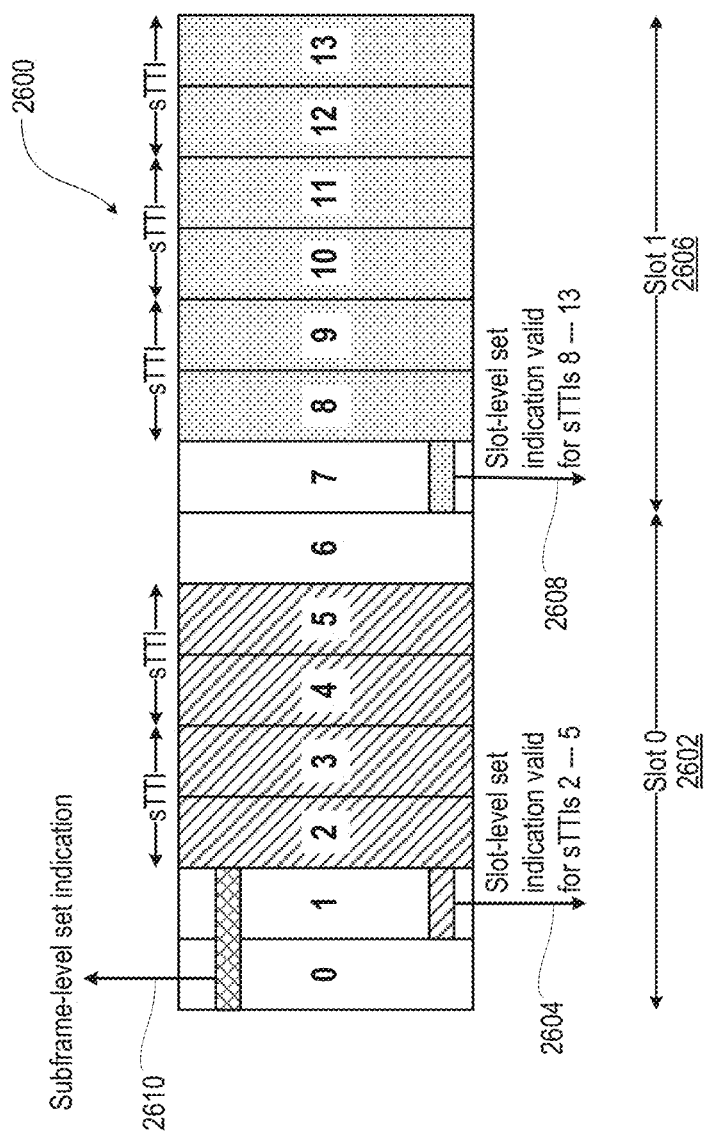
FIG. 26 illustrates a graphical representation of a subframe having a subframe-level set indication.

FIG. 26 illustrates a subframe 2600 having a slot 0 2602 having slot-level set indication valid 2604 for four sTTIs 2-5 and a slot 1 2606 with slot-level set indication valid 2608 for the identified sTTIs 8-13. FIG. 26 further illustrates a subframe-level set indication 2610.

In yet an additional aspect, a new spdcch-candidateReductions parameter can be introduced which can be dependent on various parameters, such as: (i) sTTI length; (ii) a number of carriers configured for sTTI operation; and (iii) a pdcch-candidateReductions parameter. In one or more embodiments, the eNB can signal the new parameter. In one or more embodiments, the UE can determine the candidate reduction based on the above parameters.

In yet another aspect, first level DCI can indicate either implicitly or explicitly a TDD configuration to be used for the sTTIs of the subframe.

In one or more embodiments, a method performed by a UE includes receiving configuration signaling indicating a plurality of PRB-sets. The method includes detecting a first control message, the first control message transmitted in the beginning portion of a subframe. The method includes monitoring at least a second control message, where the second control message transmitted on a first PRB-set belongs to the plurality of PRB-sets in a short TTI within the subframe, and where the first PRB-set is determined using an indication in the first control message.

For example, the plurality of PRB-sets can include at least a second PRB-set in addition to the first PRB-set. The first and second PRB-sets occupy different resource block locations. For another example, the plurality of PRB-sets can include at least a second PRB-set in addition to the first PRB-set, wherein the first and second PRB-sets span a different number of resource blocks. For an additional example, the method can include determining a number of control channel monitoring candidates from the indication in the first control message; and monitoring the second control message using the determined number. For a further example, the method can include determining the first PRB-set using an indication in the first control message further comprises, determining a first subset of PRB-sets within the plurality of PRB-sets using the indication in the first control message, wherein the first set belongs to the first subset of PRB-sets. For example, assuming that the UE is configured with sets 0, 1, 2, 3, 4, 5 (plurality of sets), the indication can either directly identify the first set (e.g. set 0) or the indication can identify a subset of sets (e.g. 0, 1, 2).

In one or more embodiments, a method includes receiving a first indication in a first TTI, the indication indicating for the duration of the first TTI, the presence of: (i) a first number of control decoding candidates; and (ii) a second number of control decoding candidates. The method includes determining, by use of a processor: (i) a first set of control channel decoding candidates based on the first number of control decoding candidates; and (ii) a second set of control channel decoding candidates based on the second number of control decoding candidates. The method includes decoding: (i) control channel decoding candidates of the first set of control channel decoding candidates and (ii) control channel decoding candidates of the second set of control channel decoding candidates. Each control channel decoding candidate of the first set of control channel decoding candidates spans the first TTI. Each control channel decoding candidate of the second set of control channel decoding candidates spans a second TTI. The first TTI length and the second TTI length are different. The first TTI contains a set of TTIs of the second TTI length. For example, the first TTI can be a 1ms-TTI, and the second TTI can be an sTTI.

For example, the method can include determining the configuration of control decoding candidates in each TTI of the second TTI length. The configuration includes one or more of: (i) a number of decoding candidates, and (ii) aggregation levels of the decoding candidates.

For a further example, a first subset of the set of TTIs of the second TTI length can have a first configuration of the control decoding candidates and a second subset of the set of TTIs of the second TTI length can have a second configuration of the control decoding candidates. The first and the second configurations can be different with the first subset and the second subset not overlapping.

In a particular embodiment, the method can include determining the configuration of control decoding candidates in each TTI of the second TTI length based on the presence of CRS in the TTI.

In one embodiment, the method includes receiving an indication indicating: (i) TTIs of the second TTI length belonging to the first subset; and (ii) TTIs of the second TTI length belonging to the second subset. For example, this indication could be an RRC, or could be a DCI indicating a possible set as illustrated in FIG. 5.

In one embodiment, the UE can receive, via higher layers such as the RRC, a default number of first and second sets of control decoding candidates for each TTI of the first TTI duration. In a particular embodiment, if the first indication is not received, the method includes determining: (i) the first set of control channel decoding candidates based on the default first number; and (ii) the second set of control channel decoding candidates based on the default second number of control decoding candidates.

In one embodiment, the method includes receiving the first indication in a control message sent in a known set of resources with known aggregation levels. In a particular embodiment the first indication is sent in one of: (i) one PDCCH candidate at aggregation level 4 with the CCEs corresponding to the PDCCH candidate given by CCEs numbered 0,1,2,3; and (ii) one PDCCH candidate at aggregation level 8 with the CCEs corresponding to the PDCCH candidate given by CCEs numbered 0, 1, 2, 3, 4, 5, 6, 7. In an exemplary embodiment, the CRC of the first indication is scrambled by CC-RNTI using the same RNTI as LAA.

In one or more embodiments, the method includes determining a TDD configuration with multiple UL/DL switching points based on the first indication.

In one or more embodiments, the method includes receiving a first indication via a higher layer for a first UE specific search space at a first aggregation level for a serving cell, the first search space corresponding to a first TTI length. The method also includes receiving a second indication via the higher layer for a second UE specific search space at a second aggregation level for a serving cell, the second search space corresponding to a second TTI length. The method further includes determining, by use of a processor: (i) a first number of control decoding candidates for the first UE specific search space; and (ii) a second number of control decoding candidates for the second UE specific search space. The first TTI length and the second TTI length are different. In a particular embodiment, the first number of control decoding candidates and the second number of control decoding candidates are determined based on one or more of the first indication, and a number of carriers configured for operation with the first TTI length and a number of carriers configured for the operation with the second TTI length.

Figure 27:
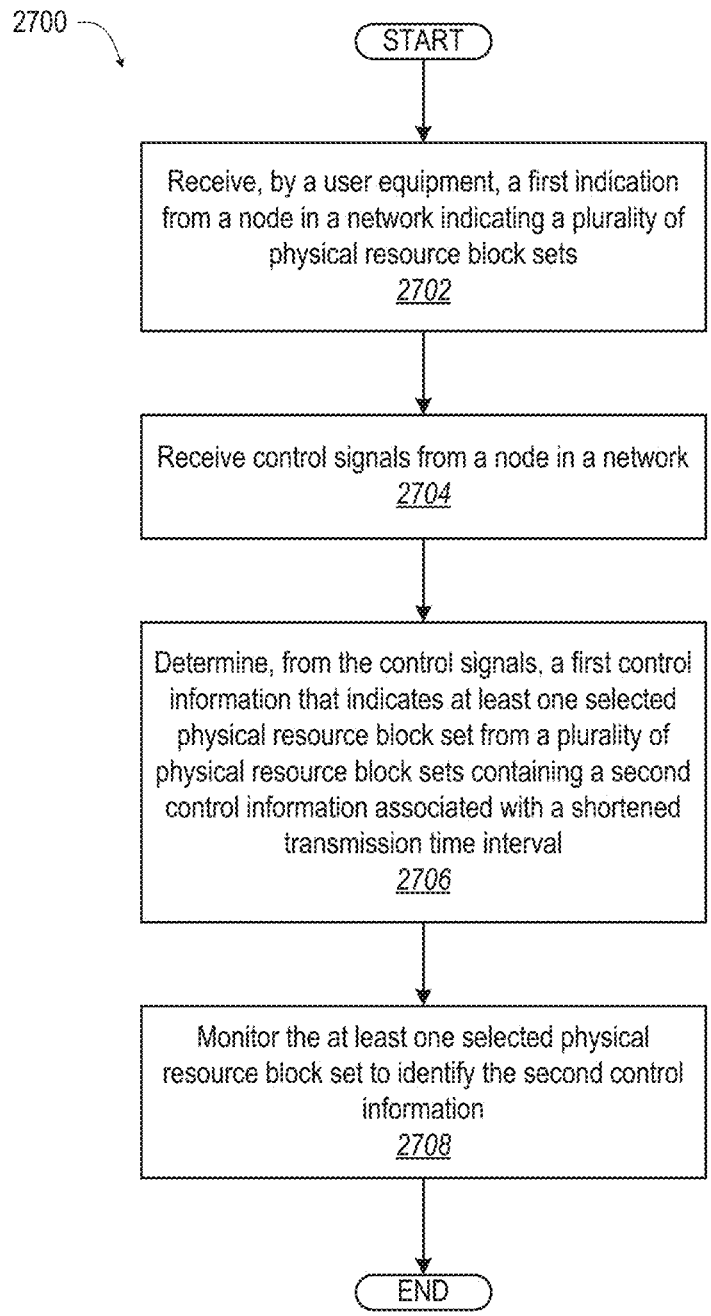
FIG. 27 provides a flow chart of a method of control channel monitoring for reduced latency operation, according to one or more embodiments.

FIG. 27 illustrates a method 2700 of control channel monitoring for reduced latency operation. In one or more embodiments, the method 2700 includes receiving, by a user equipment, a first indication from a node in a network indicating a plurality of physical resource block sets (block 2702). The method 2700 includes receiving control signals from a node in a network (block 2704). The method 2700 includes determining, from the control signals, a first control information that indicates at least one selected physical resource block set from a plurality of physical resource block sets containing a second control information associated with a shortened transmission time interval (block 2706). The method 2700 includes monitoring the at least one selected physical resource block set to identify the second control information (block 2708).

Figure 28:
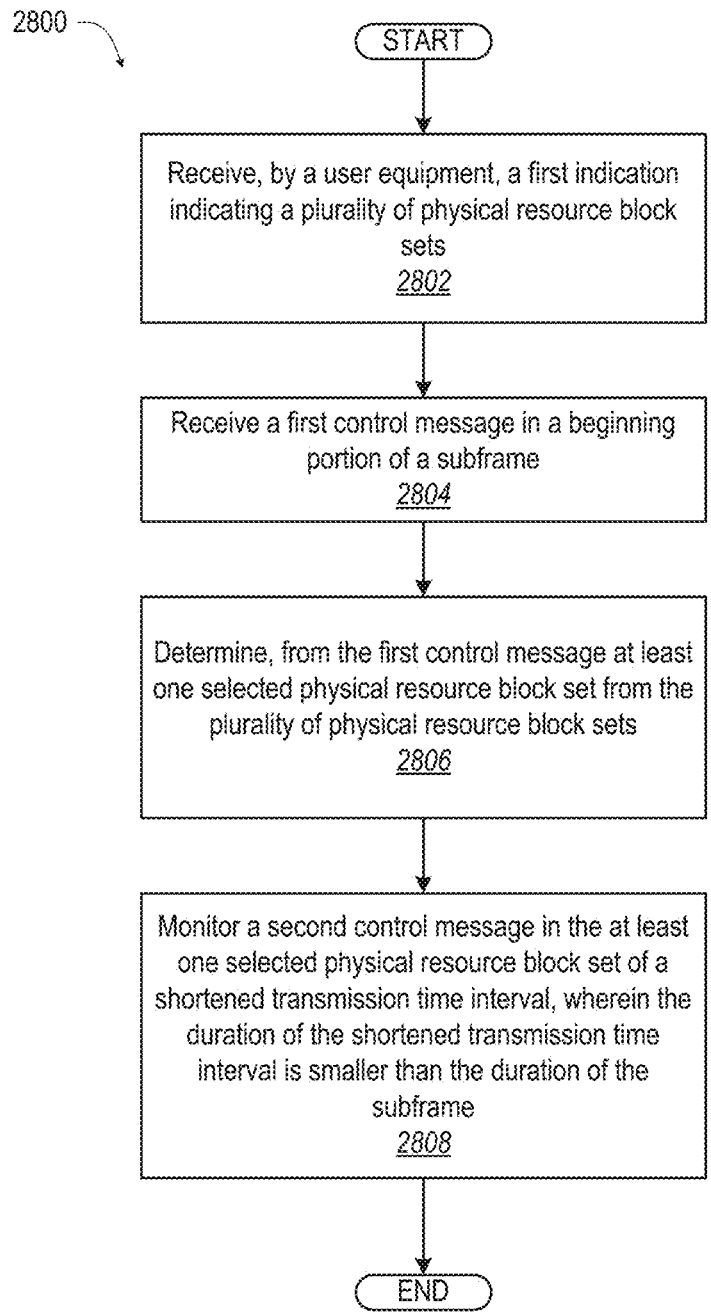
FIG. 28 provides a flow chart of a method of control channel monitoring for reduced latency operation, according to one or more embodiments.

FIG. 28 illustrates method 2800, which includes receiving, by a user equipment, a first indication indicating a plurality of physical resource block sets (block 2802). Method 2800 includes receiving a first control message in a beginning portion of a subframe (block 2804). Method 2800 includes determining, from the first control message at least one selected physical resource block set from the plurality of physical resource block sets (block 2806). Method 2800 includes monitoring a second control message in the at least one selected physical resource block set of a shortened transmission time interval, wherein the duration of the shortened transmission time interval is smaller than the duration of the subframe (block 2808).

In each of the above flow charts presented herein, certain steps of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
    receiving, by a user equipment via higher layer signaling, a first indication indicating a physical resource block set for control channel monitoring on a serving cell;
    receiving, via the higher layer signaling, a second indication comprising a bit-map, the bit-map indicating (i) a first configuration for a first set of shortened transmission time intervals of a subframe and (ii) a second configuration for a second set of shortened transmission time intervals of the subframe;
    monitoring a first set of control channel candidates on the physical resource block set in the first set of shortened transmission time intervals according to the first configuration; and monitoring a second set of control channel candidates in the physical resource block set in the second set of shortened transmission time intervals according to the second configuration.

2. The method of claim 1, wherein:
the first set of shortened transmission time intervals is exclusive of the second set of shortened transmission time intervals; and
monitoring the first set and the second set of control channel candidates comprises attempting to decode each of the control channel candidates in a respective one of the first set and the second set according to a monitored downlink control information (DCI) format corresponding to a respective first set or second set of control channel candidates.

3. The method of claim 1, wherein the second configuration is different from the first configuration by having at least one of: (i) a different number of control channel or decoding candidates than the first configuration; and (ii) a different aggregation level of the control channel candidates than the first configuration.

4. The method of claim 1, wherein the second configuration is different from the first configuration by having a different set of resource blocks than the first configuration.

5. The method of claim 1, wherein the physical resource block set is a first physical resource block set, the method further comprising:
monitoring the first set and second set of control channel candidates on the first physical resource block set in the corresponding first set and second set of shortened transmission time intervals of a Multicast Broadcast Single Frequency Network (MBSFN) subframe;
receiving a third indication of a second physical resource block set for control channel monitoring; and
monitoring a third set of control channel candidates on the second physical resource block set in a third set of shortened transmission time intervals of a non-MBSFN subframe;
wherein the monitoring of control channel candidates on the first physical resource block set is different from the monitoring of the third set of control channel candidates on the second physical resource block set by at least one difference from among: (i) spanning a different number of resource blocks; (ii) utilizing a different number of control channel or decoding candidates; (iii) utilizing a different number and value of aggregation levels; and (iv) having a different location of resource blocks.

6. The method of claim 1, further comprising receiving a third indication indicating at least one of:
a part of a system bandwidth to be used for transmissions in the first and second set of shortened transmit time intervals of the subframe; and
a time stamp to when the part of the system bandwidth is applied to.

7. The method of claim 6, further comprising
receiving a downlink control message on a control channel candidate of the first set and second set of control channel candidate, the downlink control message allocating a plurality of resource blocks for downlink data transmissions in the indicated part of the system bandwidth.

8. The method of claim 1, further comprising:
receiving control signaling indicating at least one of: (i) a first user equipment-specific search space corresponding to the subframe and at a first aggregation level for the serving cell; and (ii) a second user equipment-specific search space corresponding to the shortened transmission time interval and at a second aggregation level for the serving cell; and
determining, based upon the received control signaling, (a) a first number of control decoding candidates for the first user equipment-specific search space and (b) a second number of control decoding candidates for the second user equipment-specific search space.

9. The method of claim 8, further comprising:
receiving in the control signaling an indication of only one of the first and second user equipment-specific search space; and
determining a next one of the first and second user equipment-specific search spaces based on at least one of: (i) the indication of the one of the first and second user-specific search space; (ii) a number of carriers configured for downlink data transmissions using transmission time intervals of the subframe length; and (iii) a number of carriers configured for downlink data transmissions using transmission time intervals of the first shortened transmission time interval length.

10. The method of claim 1, wherein the physical resource block set for control channel monitoring is configured for either localized control channel transmission or distributed control channel transmission.

11. The method of claim 1, wherein the control channel is a shortened Physical Downlink Control Channel (PDCCH), and the UE is not required to monitor enhanced PDCCH (EPDCCH) on the serving cell.

12. A user equipment comprising:
a transceiver;
a signal processing unit coupled to the transceiver and that is configured to receive a subframe comprising a plurality of time-frequency resources; and
a processor in communication with the signal processing unit and which:
receives, via higher layer signaling, a first indication indicating a physical resource block set for control channel monitoring on a serving cell;
receives, via the higher layer signaling, a second indication comprising a bit-map, the bit-map indicating (i) a first configuration for a first set of shortened transmission time intervals of a subframe and (ii) a second configuration for a second set of shortened transmission time intervals of the subframe;
monitors a first set of control channel candidates on the physical resource block set in the first set of shortened transmission time intervals according to the first configuration; and
monitors a second set of control channel candidates in the physical resource block set in the second set of shortened transmission time intervals according to the second configuration.

13. The user equipment of claim 12, wherein:
the first set of shortened transmission time intervals is exclusive of the second set of shortened transmission time intervals;
the second configuration is different from the first configuration by having at least one of: (i) a different number of control channel or decoding candidates than the first configuration; (ii) a different aggregation level of the control channel candidates than the first configuration; and (iii) a different set of resource blocks than the first configuration; and
the processor, in monitoring the first set and the second set of control channel candidates, attempts to decode each of the control channel candidates in a respective one of the first set and the second set according to a monitored downlink control information (DCI) format corresponding to a respective first set or second set of control channel candidates.

14. The user equipment of claim 13, wherein the physical resource block set is a first physical resource block set, and the processor:
monitors the first set and second set of control channel candidates on the first physical resource block set in the corresponding first set and second set of shortened transmission time intervals of a Multicast Broadcast Single Frequency Network (MBSFN) subframe;
receives a third indication of a second physical resource block set for control channel monitoring; and
monitors a third set of control channel candidates on the second physical resource block set in a third set of shortened transmission time intervals of a non-MBSFN subframe;
wherein the processor monitoring of control channel candidates on the first physical resource block set is different from the processor monitoring of the third set of control channel candidates on the second physical resource block set by at least one difference from among: (i) spanning a different number of resource blocks; (ii) utilizing a different number of control channel or decoding candidates; (iii) utilizing a different number and value of aggregation levels; and (iv) having a different location of resource blocks.

15. The user equipment of claim 12, wherein the processor:
receives a third indication indicating at least one of: a part of a system bandwidth to be used for transmissions in the first and second set of shortened transmit time intervals of the subframe; and a time stamp to when the part of the system bandwidth is applied to.

16. The user equipment of claim 15, wherein the processor:
receives a downlink control message on a control channel candidate of the first set and second set of control channel candidate, the downlink control message allocating a plurality of resource blocks for downlink data transmissions in the indicated part of the system bandwidth.

17. The user equipment of claim 12, wherein the processor:
receives control signaling indicating at least one of: (i) a first user equipment-specific search space corresponding to the subframe and at a first aggregation level for the serving cell; and (ii) a second user equipment-specific search space corresponding to the shortened transmission time interval and at a second aggregation level for the serving cell; and
determines, based upon the received control signaling, (a) a first number of control decoding candidates for the first user equipment-specific search space and (b) a second number of control decoding candidates for the second user equipment-specific search space.

18. The user equipment of claim 17, wherein the processor:
receives, in the control signaling, an indication of only one of the first and second user equipment-specific search space; and
determines a next one of the first and second user equipment-specific search spaces based on at least one of: (i) the indication of the one of the first and second user-specific search space; (ii) a number of carriers configured for downlink data transmissions using transmission time intervals of the subframe length; and (iii) a number of carriers configured for downlink data transmissions using transmission time intervals of the first shortened transmission time interval length.

19. A method comprising:
transmitting, by a node via higher layer signaling, a first indication to a user equipment in a network indicating a physical resource block set for control channel monitoring on a serving cell;
transmitting, by the node via the higher layer signaling, a second indication comprising a bit-map, the bit-map indicating (i) a first configuration for a first set of shortened transmission time intervals of a subframe and (ii) a second configuration for a second set of shortened transmission time intervals of the subframe;
transmitting control signals to the user equipment, wherein the control signals contain a first control information that indicates at least one selected physical resource block set from the plurality of physical resource block sets that contains a second control information associated with a shortened transmission time interval; and
transmitting the at least one selected physical resource block set to identify the second control information.

20. The method of claim 19, further comprising assigning a first subset of decoding candidates used in a first transmit time interval of the subframe and a second subset of decoding candidates used in a second transmission time interval of the subframe, wherein the first subset is exclusive of the second subset and the second transmission time interval comprises an shortened transmission time interval and the first transmission time interval comprises two or more shortened transmission time intervals.

21. The method of claim 20, further comprising assigning a respective first and second configuration of each transmission time interval of the two or more shortened transmission time intervals of the first transmission time interval, the first and second configurations each comprising at least one of: (i) a number of decoding candidates; and (ii) an aggregation level of the decoding candidates.

22. The method of claim 19, further comprising transmitting, in the control signals, an indication of one of the first and second user-specific search space, enabling the user equipment to determine another one of the first and second-specific search spaces based on at least one of: (i) the indication of the one of the first and second user-specific search space; (ii) a number of carriers configured for operation with a length of the first transmission time interval; and (iii) a number of carriers configured for operation with a length of the second transmission time interval.

* * * * *